United States Patent
Oberst et al.

(10) Patent No.: US 10,870,180 B2
(45) Date of Patent: Dec. 22, 2020

(54) AUTOMATED ENGAGEMENT AND HANDLING OF A STRUCTURE

(71) Applicant: The Boeing Company, Chicago, IL (US)

(72) Inventors: Kyle Lee Oberst, Everett, WA (US); Mark Eduard Pflum, Mukilteo, WA (US); Henry Thomas Youngblood, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/244,480

(22) Filed: Jan. 10, 2019

(65) Prior Publication Data
US 2020/0223020 A1   Jul. 16, 2020

(51) Int. Cl.
| | | |
|---|---|---|
| *B23P 19/00* | (2006.01) | |
| *B64F 5/10* | (2017.01) | |
| *B23P 19/10* | (2006.01) | |
| *B23P 21/00* | (2006.01) | |

(52) U.S. Cl.
CPC ............. *B23P 19/002* (2013.01); *B23P 19/10* (2013.01); *B23P 21/002* (2013.01); *B64F 5/10* (2017.01); *B23P 2700/01* (2013.01)

(58) Field of Classification Search
CPC ....... B23P 19/002; B23P 21/002; B23P 19/10; B23P 2700/01; B64F 5/10; B25J 15/0033; B25J 15/0047; B25B 5/14; B25B 13/105; B25B 13/5058; B25B 11/02; B25B 3/00
USPC ......... 294/902; 414/754; 269/257, 266, 270, 269/271
See application file for complete search history.

(56) References Cited

U.S. PATENT DOCUMENTS

| | | | |
|---|---|---|---|
| 4,528,448 A | | 7/1985 | Doggett |
| 4,710,026 A | | 12/1987 | Magome et al. |
| 4,738,583 A | * | 4/1988 | MacConochie ............ B25J 5/00 180/8.6 |
| 4,956,553 A | | 9/1990 | Matsui |
| 4,995,146 A | * | 2/1991 | Woods .................... B25B 5/003 269/45 |
| 5,249,785 A | * | 10/1993 | Nelson .................. B25B 11/005 269/21 |
| 5,489,986 A | | 2/1996 | Magome et al. |
| 5,596,413 A | | 1/1997 | Stanton et al. |
| 5,654,540 A | | 8/1997 | Stanton et al. |
| 6,098,260 A | * | 8/2000 | Sarh ........................ B21J 15/10 227/52 |
| 6,598,866 B2 | * | 7/2003 | Helm ..................... B23Q 1/032 269/21 |

(Continued)

OTHER PUBLICATIONS

R.J. Tansey et al., "Interferometer Encoder Techniques", Jan. 8, 1988, pp. 1-52.

(Continued)

*Primary Examiner* — Lynn E Schwenning
(74) *Attorney, Agent, or Firm* — Haynes and Boone, LLP

(57) ABSTRACT

A method and apparatus for automated handling a structure. A handler system comprises a plurality of towers and a plurality of end effectors coupled to the plurality of towers. Each of the plurality of end effectors is movably coupled to a tower of the plurality of towers. Each of the plurality of end effectors comprises an arm coupled to the tower and a coupling device for use in automated engagement of a corresponding fitting coupled to the structure.

20 Claims, 27 Drawing Sheets

(56) References Cited

U.S. PATENT DOCUMENTS

| | | | |
|---|---|---|---|
| 6,897,961 B2 | 5/2005 | Muenter | |
| 7,624,488 B2 * | 12/2009 | Lum | B25B 5/14 |
| | | | 269/287 |
| 9,517,895 B2 * | 12/2016 | Bacalia | B25J 9/00 |
| 2002/0014581 A1 | 2/2002 | Yamamoto et al. | |
| 2008/0000069 A1 * | 1/2008 | Savoy | B62D 65/02 |
| | | | 29/430 |
| 2013/0185925 A1 * | 7/2013 | Sarh | B21J 15/142 |
| | | | 29/559 |

OTHER PUBLICATIONS

R.M. Tansey, "An Absolute Distance Interferometer Using a Dye Laser Heterodyne Interferometer and Spatial Separation of Beams", Proceedings of SPIE—The International Society for Optical Engineering, vol. 429, Precision Surface Metrology, Aug. 23-24, 1983, pp. 43-54.

* cited by examiner

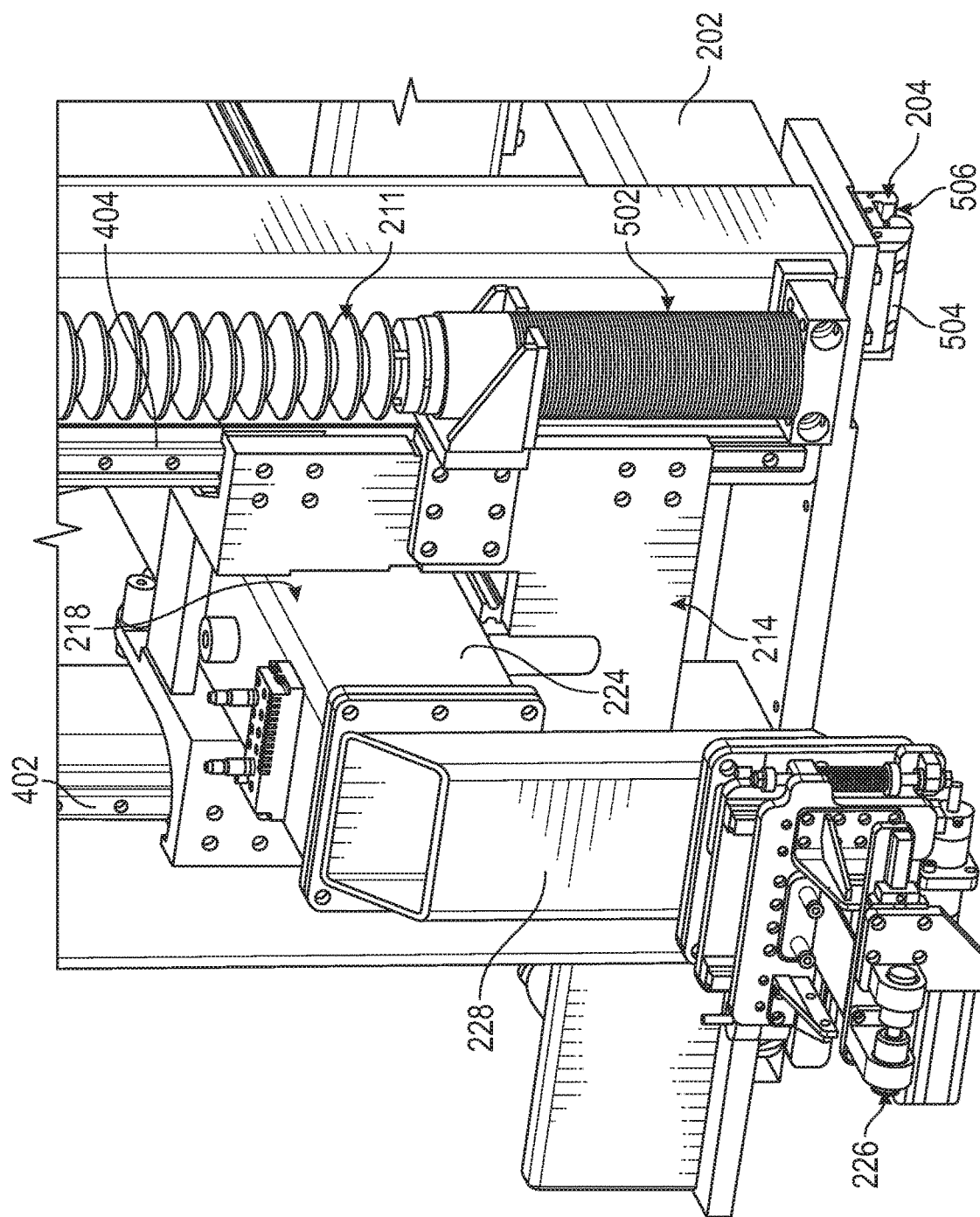
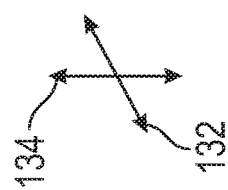
FIG. 5

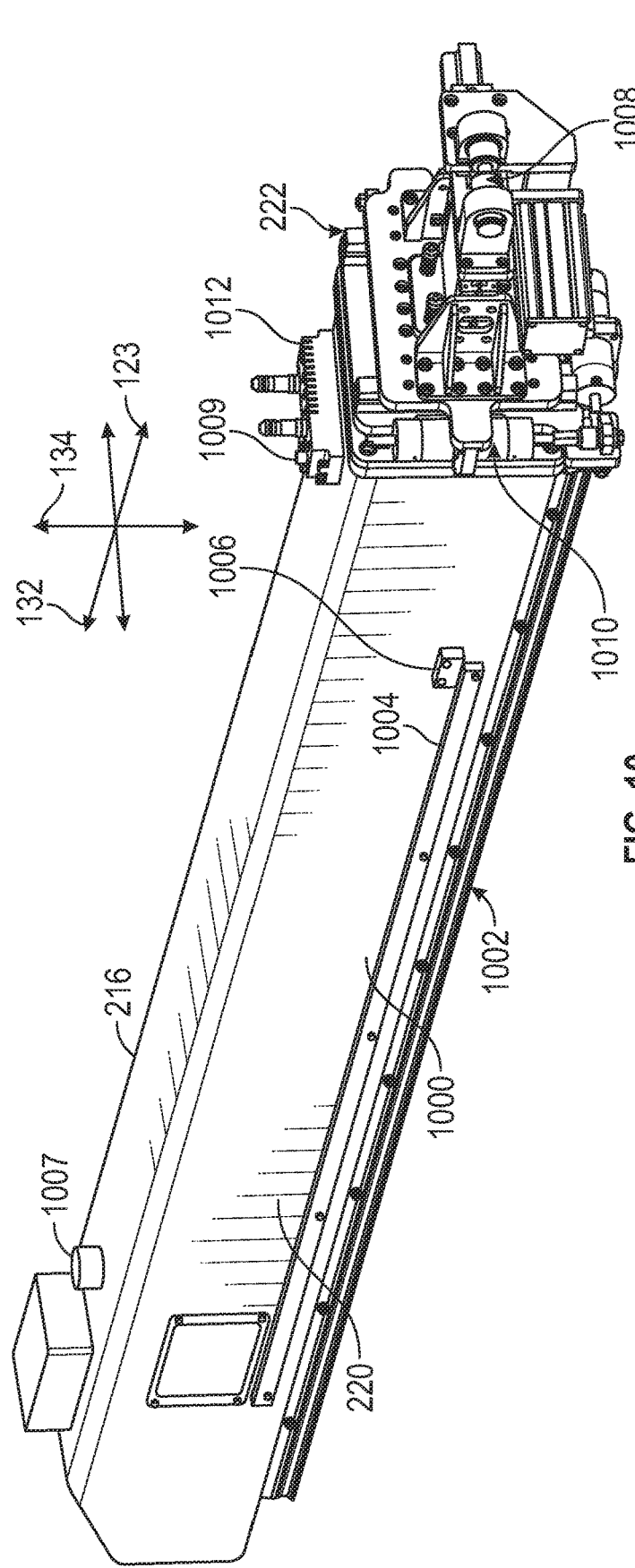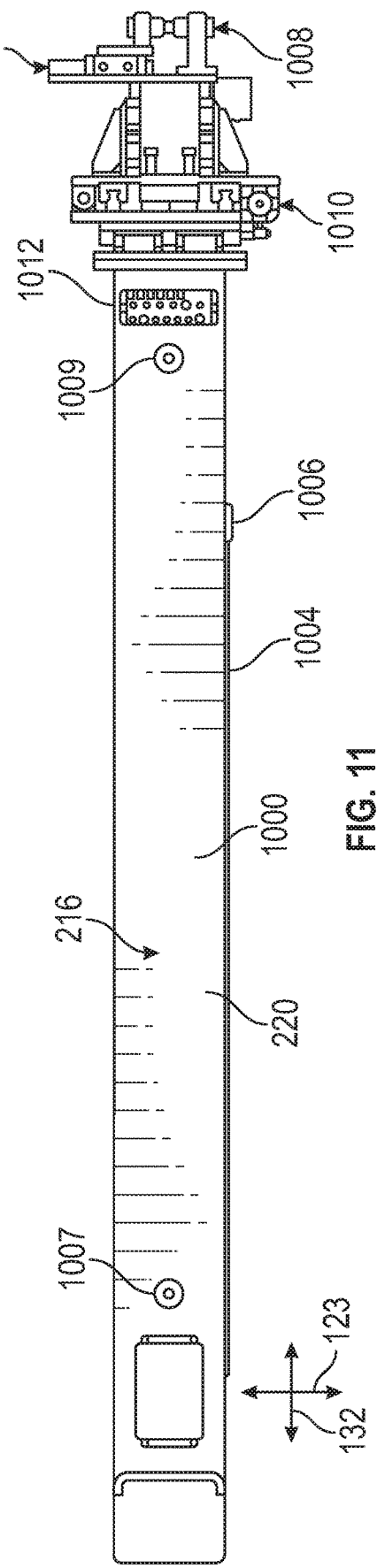
FIG. 10
FIG. 11

AUTOMATED ENGAGEMENT AND HANDLING OF A STRUCTURE

CROSS-REFERENCE TO RELATED APPLICATION

This is related to U.S. patent application Ser. No. 16/244,516, filed Jan. 10, 2019, entitled "Automated Engagement of and Disengagement from a Fitting," filed even date hereof and incorporated herein by reference in its entirety.

FIELD

This disclosure generally relates to engagement and handling of a structure and, more particularly, to methods and apparatuses for automated engagement and handling of a structure using one or more handler systems, each having multiple end effectors.

BACKGROUND

Building certain large, complex assemblies oftentimes requires moving and manipulating large components across a manufacturing environment. Some currently available systems for moving such large components may take up more space than desired within the manufacturing environment. For example, some large components may be moved across a manufacturing environment via an overhead crane or a large tooling apparatus.

Larger tooling apparatuses may be used to position large components, such as fuselage side panels, but these tooling apparatuses are oftentimes large, expensive, immobile, and have limited adaptability. Using cranes may be more difficult than desired. Further, due to the massive nature of overhead cranes and because they are typically manually operated, using cranes may pose scheduling issues and may cause undesired delays. For example, while an overhead crane is transporting a component overhead across a manufacturing environment, other work may need to be paused until transport has been completed.

Further, using overhead cranes to transport large components that are meant to be secured to a side of an even larger assembly (e.g., a fuselage side panel of a fuselage assembly) may be more difficult than desired. Overhead cranes may be more than cumbersome than desired for such transporting such a large component and may be less accurate than desired in positioning the large component relative to the larger assembly being built.

SUMMARY

In one example embodiment, a method for automated engagement and handling of a structure is provided. A handler system is moved into a position relative to a support that is holding the structure, the handler system including a plurality of end effectors. The plurality of end effectors is positioned relative to a plurality of fittings coupled to the structure. The plurality of fittings is engaged with the plurality of end effectors to secure the structure to the handler system, wherein each of the plurality of fittings is engaged by a corresponding end effector of the plurality of end effectors. The handler system with the structure secured to the handler system is moved away from the support.

In another example embodiment, a method is provided for automated handling of a structure. A handler system with the structure secured to the handler system is moved for positioning alongside an assembly, the handler system being having a plurality of end effectors engaged with a corresponding plurality of fittings coupled to the structure. The handler system positions the structure in a selected position relative to the assembly using a laser guidance system. The structure is joined to the assembly. The plurality of end effectors is disengaged from the corresponding plurality of fittings after the structure has been joined with the assembly. The handler system is moved away from the assembly.

In yet another example embodiment, a handler system comprises a plurality of towers and a plurality of end effectors coupled to the plurality of towers. Each of the plurality of end effectors is movably coupled to a tower of the plurality of towers. Each of the plurality of end effectors comprises an arm coupled to the tower and a coupling device for use in automated engagement of a corresponding fitting coupled to the structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

FIG. 5 is an illustration of an enlarged view of the engagement device and the cradle from FIG. 2 in accordance with an example embodiment.

FIG. 10 is an illustration of an end effector from FIGS. 2-4 in accordance with an example embodiment.

FIG. 11 is an illustration of a top view of the end effector from FIG. 10 in accordance with an example embodiment.

DETAILED DESCRIPTION

The example embodiments described below provide methods and apparatuses for improving the efficiency and ease with which large structural components may be handled, or manipulated. The example embodiments described below provide a handler system for automating the engagement of structures, transport of these structures, and positioning of these structures relative in-build assemblies.

The handler system uses electromechanical and computer-controlled devices to perform automated engagement and handling of a structure. In one example embodiment, a handler system is moved into a position relative to a support that is holding the structure, the handler system including a plurality of end effectors. The plurality of end effectors is positioned relative to a plurality of fittings coupled to the structure. The plurality of fittings is engaged with the plurality of end effectors to secure the structure to the handler system, wherein each of the plurality of fittings is engaged by a corresponding end effector of the plurality of end effectors. The handler system with the structure secured to the handler system is moved away from the support. Each of the plurality of end effectors may be adaptable for fittings of various thicknesses without requiring that components of the end effector be manually adjusted or replaced.

The handler system and methods of operating the handler system described below may be used to automate the handling of, for example, fuselage side panels in a manner that improves airplane production and improves production rates. The example embodiments use a combination of modular tooling and automation to eliminate the need for massive manipulators (e.g., overhead cranes). The handler system may be fully automated or semi-automated, depending on the implementation.

With respect to aircraft assembly, the example embodiments provide methods and apparatus that may provide time savings of about 9 hours per aircraft. The handler system is capable of retrieving a fuselage side panel from a support (e.g., a holding fixture), transporting the fuselage side panel within a manufacturing environment (e.g., a factory) to an assembly area, and positioning the fuselage side panel relative to the fuselage assembly being built.

A single handler system may have the capability for use with a wide variety of fuselage side panels for a variety of aircraft configurations. For example, a single handler system has a plurality of end effectors that may be moved to an infinite number of positions within their range of motion, and that are fully programmable for semi-autonomous movement to pre-set positions for engagement with fuselage side panels. Further, using this type of handler system may improve overall safety during fuselage assembly.

Figure 1:
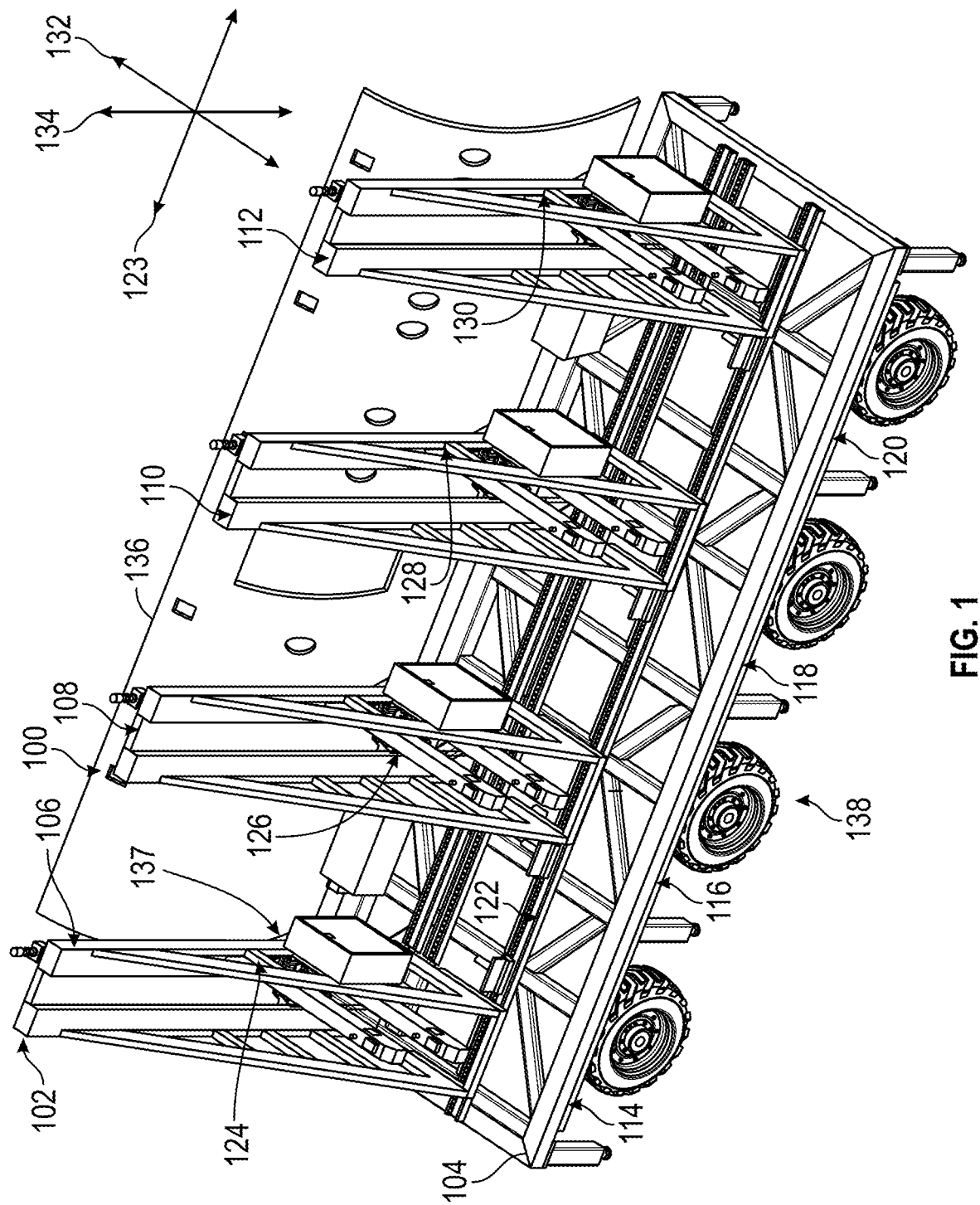
FIG. 1 is an illustration of a perspective view of handler system 100 in accordance with an example embodiment.

Referring now to the figures, FIG. 1 is an illustration of a perspective view of handler system 100 in accordance with an example embodiment. Handler system 100 includes a plurality of towers 102 and platform structure 104. Towers 102 are coupled to platform structure 104.

A first component, such as one of towers 102, may be coupled to another component, such as platform structure 104, by being directly attached to, secured to, or otherwise connected to the second component, indirectly attached to, secured to, or otherwise connected to the second component, or integrated as part of the second component.

Towers 102 includes tower 106, tower 108, tower 110, and tower 112. Tower 106, tower 108, tower 110, and tower 112 are coupled to portion 114, portion 116, portion 118, and portion 120, respectively, of platform structure 104.

Track system 122 is coupled to platform structure 104. Track system 122 may include any number of tracks, motors, brakes, sensors, or other types of components to facilitate movement along track system 122. In this illustrative example, track system 122 includes at least two tracks.

In this illustrative example, towers 102 are coupled to platform structure 104 via track system 122. In particular, each of tower 106, tower 108, tower 110, and tower 112 is movably coupled to track system 122 and thereby movably coupled to platform structure 104. For example, each of tower 106, tower 108, tower 110, and tower 112 is movable along track system 122 in a direction substantially parallel to x-axis 123 relative to platform structure 104. As used herein, substantially parallel may mean parallel or nearly parallel.

As depicted, multiple end effectors are coupled with each of towers 102. For example, pair of end effectors 124 is coupled with tower 106; pair of end effectors 126 is coupled with tower 108; pair of end effectors 128 is coupled with tower 110; and pair of end effectors 130 is coupled with tower 112. In these illustrative examples, each end effector of these pairs of end effectors is movably coupled to the corresponding tower. For example, each end effector of pair of end effectors 124 is movably coupled to tower 106; each end effector of pair of end effectors 126 is movably coupled with tower 108; each end effector of pair of end effectors 128 is movably coupled with tower 110; and each end effector of pair of end effectors 130 is movably coupled with tower 112.

In one illustrative example, each end effector of pair of end effectors 124, pair of end effectors 126, pair of end effectors 128, and pair of end effectors 130 is translatable relative to the corresponding one of towers 102 to which it is coupled, in a direction substantially parallel to y-axis 132, in a direction substantially parallel to z-axis 134, or both. Movement relative to a tower may also be considered movement relative to platform structure 104. In this manner, in some illustrative examples, each end effector is ultimately translatable in relative to platform structure 104 with respect to at least one of x-axis 123, y-axis 132, or z-axis 134.

Handler system 100 is used to engage and support a structure such as, for example, but not limited to, panel 136. Panel 136 may take the form of a fuselage panel, a wing panel, or some other type of aircraft panel. In other illustrative examples, panel 136 may the form of a panel for some other type of complex platform or vehicle. Depending on the implementation, panel 136 may be a single structure or may be comprised of multiple panels joined together. Panel 136 is held by a support, not shown in this view.

A plurality of fittings 137 are coupled to panel 136. Each end effector of pair of end effectors 124, pair of end effectors 126, pair of end effectors 128, and pair of end effectors 130 is coupled with a corresponding one of fittings 137.

Although not shown in this illustrative example, platform structure 104 may be coupled to mobile system 138 for use in moving handler system 100 along a floor, such as the floor of a manufacturing environment. Mobile system 138 may take a number of different forms. In one illustrative example, mobile system 138 includes one or more mobile devices such as, for example, one or more automated guided vehicles (AGVs). Depending on the implementation, mobile system 138 may be considered part of or separate from handler system 100.

Operation of handler system 100, mobile system 138, or both is controlled via a control system (not shown). The control system may have preset programs for operation of the various end effectors in handler system 100. For example, each of the end effectors of towers 102 may be pre-programmed for fully autonomous or semi-autonomous operation. The control system may have multiple programs of operation for allowing handler system 100 to be used with a variety of different types and shapes of structures for a variety of different assembly configurations.

The control system may be at least partially implemented using software, hardware, firmware, or a combination thereof. When software is used, the operations performed by the control system may be implemented using, for example, without limitation, program code configured to run on a processor unit. When firmware is used, the operations performed by the control system may be implemented using, for example, without limitation, program code and data and stored in persistent memory to run on a processor unit.

When hardware is employed, the hardware may include one or more circuits that operate to perform the operations performed by the control system. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the control system may be implemented using a computer system. The computer system may include a single computer or multiple computers in communication with each other. In one illustrative example, the control system may include a computer associated with each of towers 102 as well as another main computer.

Figure 2:
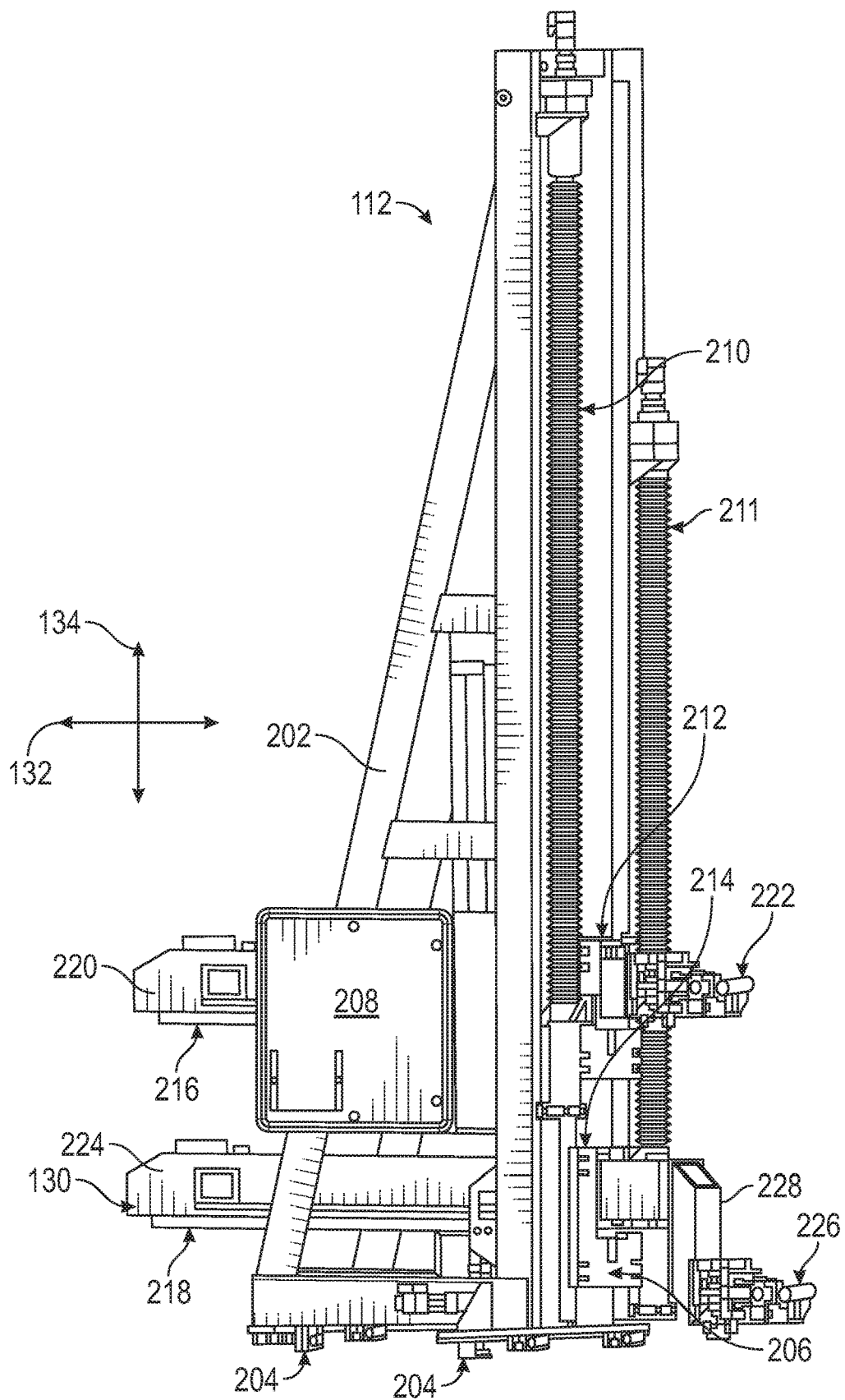
FIG. 2 is an illustration of a side perspective view of a tower with a pair of end effectors from FIG. 1 in accordance with an example embodiment.

FIG. 2 is an illustration of a side perspective view of tower 112 with pair of end effectors 130 from FIG. 1 in accordance with an example embodiment. In one illustrative example, each of towers 102 in FIG. 1 may be implemented in a manner similar to tower 112 described in FIG. 2.

As depicted in FIG. 2, tower 112 includes tower frame 202. Track connection system 204, a plurality of cradles 206, control unit 208, movement system 210, and movement system 211 are coupled to tower frame 202.

Track connection system 204 couples to track system 122 on platform structure 104. For example, tower 112 may be movably coupled to track system 122 via track connection system 204. In this illustrative example, track connection system 204 includes two pairs of track connectors. Each of these pairs of track connectors couples to a corresponding track of track system 122 in FIG. 1. With this type of coupling, track connection system 204 may slide along track system 122 in FIG. 1, to thereby slide tower 112 along track system 122.

Cradles 206 are used to hold and support pair of end effectors 130. Cradles 206 include cradle 212 and cradle 214. In this illustrative example, cradle 212 and cradle 214 are each movable relative to tower frame 202. For example, each of cradle 212 and cradle 214 may be moved vertically relative to tower frame 202 in a direction substantially parallel to z-axis 134.

In these illustrative examples, cradle 212 may be moved relative to tower frame 202 using movement system 210. Similarly, cradle 212 may be moved relative to tower frame 202 using movement system 211. Movement system 210 and movement system 211 may be implemented in a number of different ways. In one illustrative example, movement system 210 provides independent, motorized movement of cradle 212 relative to tower frame 202, while movement system 211 provides independent, motorized movement of cradle 214 relative to tower frame 202.

Cradle 212 is used to hold and support end effector 216 of pair of end effectors 130. Cradle 214 is used to hold and support end effector 218 of pair of end effectors 130. End effector 216 includes arm 220 and engagement system 222 coupled to an end of arm 220. Arm 220 may be directly coupled to cradle 212. Arm 220, and thereby engagement system 222, is movable relative to cradle 212. In this illustrative example, arm 220 is movable relative to cradle 212 in a direction substantially parallel to y-axis 132.

End effector 218 includes arm 224 and engagement system 226, which is coupled to an end of arm 224. Arm 224 may be directly coupled to cradle 214. In this illustrative example, engagement system 226 is coupled to arm 224 via extension structure 228. In these illustrative examples, extension structure 228 is fixedly attached to arm 224. In other illustrative examples, extension structure 228 is movably attached to arm 224.

Arm 224, and thereby engagement system 226, is movable relative to cradle 214. In this illustrative example, arm 224 is movable relative to cradle 214 in a direction substantially parallel to y-axis 132.

Thus, when end effector 216 is coupled to tower frame 202 via cradle 212, end effector 216 is ultimately movable relative to tower frame 202 with respect to y-axis 132, z-axis 134, or both. Similarly, when end effector 218 is coupled to tower frame 202 via cradle 214, end effector 218 is ultimately movable relative to tower frame 202 with respect to y-axis 132, z-axis 134, or both.

Each of engagement system 222 and engagement system 226 is used to engage with a fitting of a structure, such as panel 136 in FIG. 1. In these illustrative examples, engagement system 222 and engagement system 226 may be customizable to handle different sizes of fittings without requiring the addition or replacement of any components. For example, engagement system 222 and engagement system 226 may be adjustable for use with fittings of different thicknesses.

As one illustrative example, engagement system 222 and engagement system 226 may be capable of engagement with fittings having thicknesses within a selected range of thicknesses. When panel 136 is a fuselage side panel, this selected range of thicknesses for the fittings attached to the fuselage side panel may be between at least about 0.5 inches and about 1.5 inches. In one illustrative example, the selected range of thicknesses may be between about 0.4 inches and about 1.2 inches.

The movement of tower frame 202 relative to platform structure 104 in FIG. 1 via track system 122, the movement of cradles 206 relative to tower frame 202, and the movement of end effector 216 and end effector 218 relative to cradle 212 and cradle 214, respectively, is controlled via the control system described above. In particular, these movements are coordinated via the control system to ensure the proper positioning or placement of engagement system 222 and engagement system 226 relative to a corresponding pair of fittings.

In some illustrative examples, at least a portion of this control system is housed in control unit 208, which may also be referred to as a control box. Alternatively, the control system may be in communication with control unit 208. Control unit 208 may house various components including, but not limited to, at least one of a processor, a chip, a circuit, a power source (e.g., one or more batteries), a communications device (e.g., a wireless communications device), or some other type of device.

Figure 3:
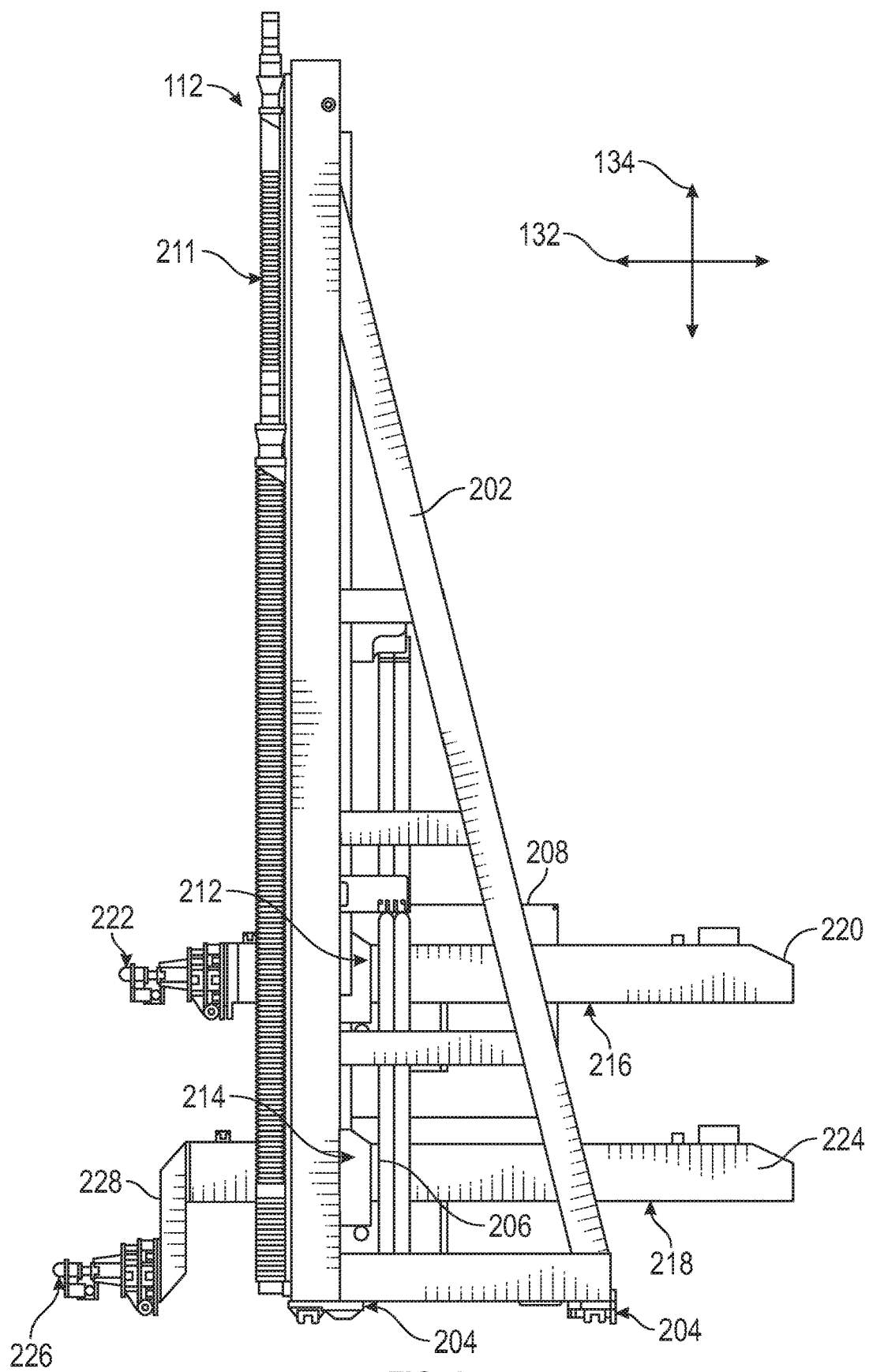
FIG. 3 is an illustration of a side view of the tower from FIG. 2 in accordance with an example embodiment.

FIG. 3 is an illustration of a side view of tower 112 from FIG. 2 in accordance with an example embodiment. As shown in this view, when cradle 212 and cradle 214 are similarly positioned relative to tower frame 202 with respect to y-axis 132 (e.g., are vertically aligned), engagement system 226 extends further out from tower frame 202 than engagement system 222 due to extension structure 228. Further, extension structure 228 results in engagement system 226 being positioned vertically below arm 224 as compared to the positioning of engagement system 222 relative to arm 220.

Figure 4:
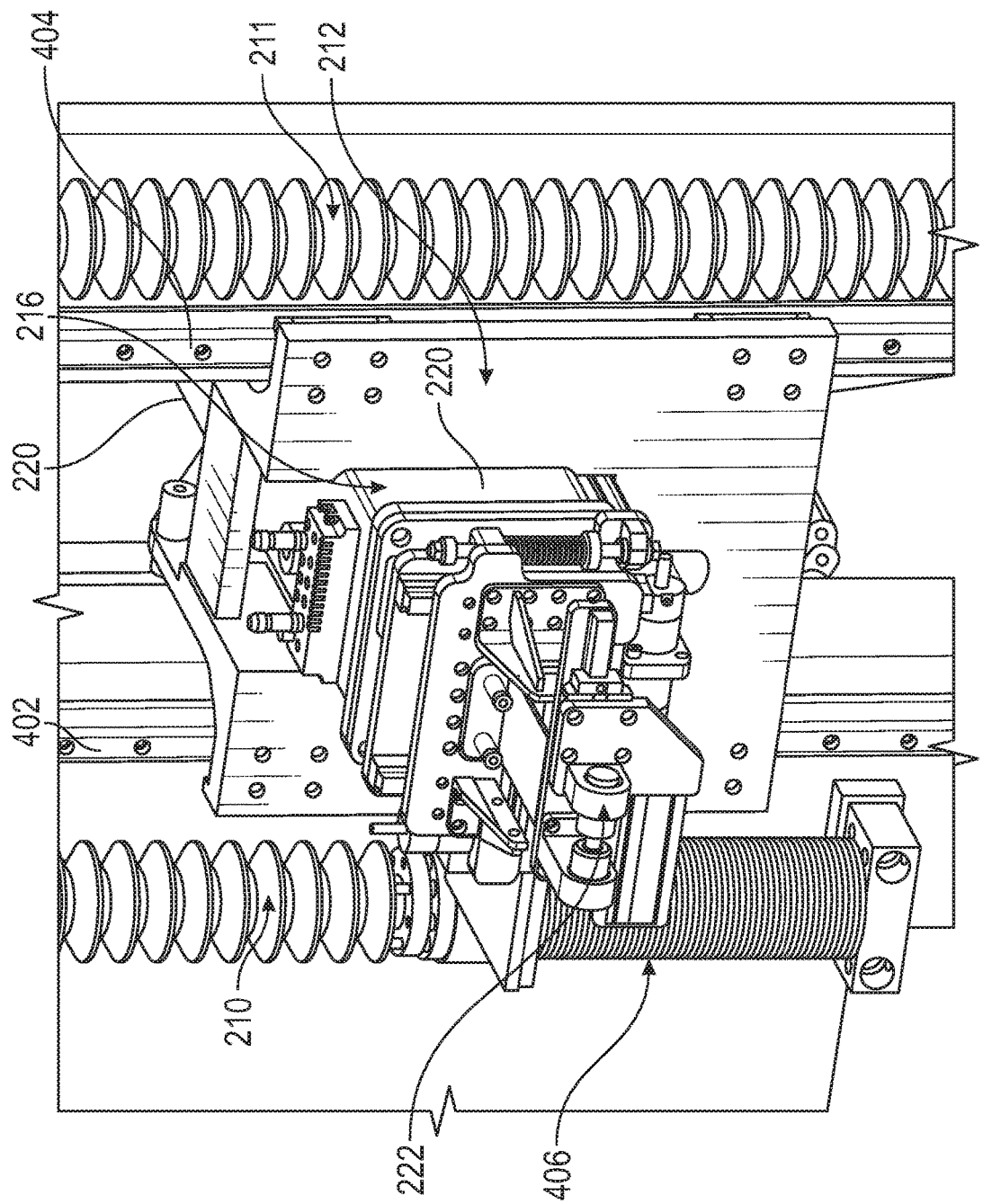
FIG. 4 is an illustration of an enlarged view of an engagement system and a cradle from FIG. 2 in accordance with an example embodiment.

FIG. 4 is an illustration of an enlarged view of engagement system 222 and cradle 212 from FIG. 2 in accordance with an example embodiment. In this illustrative example, the positioning of arm 220 within cradle 212 may be more clearly seen.

As shown in FIG. 4, rail 402 and rail 404 and coupled to tower frame 202. Cradle 212 is coupled to rail 402 and rail 404 such that cradle 212 is translatable relative to tower frame 202 in a direction substantially parallel to z-axis 134. Further, cradle 212 is coupled to movement system 210. In this illustrative example, cradle 212 is not coupled to movement system 211.

Movement system 210 may be implemented in a number of different ways. In one or more illustrative examples, movement system 210 includes at least one of an electric motor, a hydraulic motor, a compression device, an extension device, tubing, a rail system, a track system, wheels, one or more bearings, or some other type of device. In one illustrative example, movement system 210 includes motorized device 406 that is operated to move cradle 212 vertically relative to tower frame 202, in a direction substantially parallel to z-axis 134.

FIG. 5 is an illustration of an enlarged view of engagement device 226 and cradle 214 from FIG. 2 in accordance with an example embodiment. In this illustrative example, the positioning of arm 224 within cradle 214 may be more clearly seen.

As shown in FIG. 5, cradle 214 is coupled to rail 402 and rail 404 such that cradle 214 is translatable relative to tower frame 202 in a direction substantially parallel to z-axis 134. Further, cradle 214 is coupled to movement system 211. In this illustrative example, cradle 214 is not coupled to movement system 210.

Movement system 211 may be implemented in a number of different ways, similar to movement system 210. In one or more illustrative examples, movement system 211 includes at least one of an electric motor, a hydraulic motor, a compression device, an extension device, tubing, a rail system, a track system, wheels, one or more bearings, or some other type of device. In one illustrative example, movement system 211 includes motorized device 502 that is operated to move cradle 214 vertically relative to tower frame 202, in a direction substantially parallel to z-axis 134.

The coupling of extension structure 228 to arm 224 is more clearly seen in this view. Further, the coupling of cradle 214 to movement system 211 is more clearly seen in this view.

As previously described, track connection system 204 includes multiple track connectors. Track connector 504 is an example of one of these track connectors. Track connector 504 has groove 506, which may also be referred to as a channel, for receiving a track of track system 122 in FIG. 1.

Figure 6:
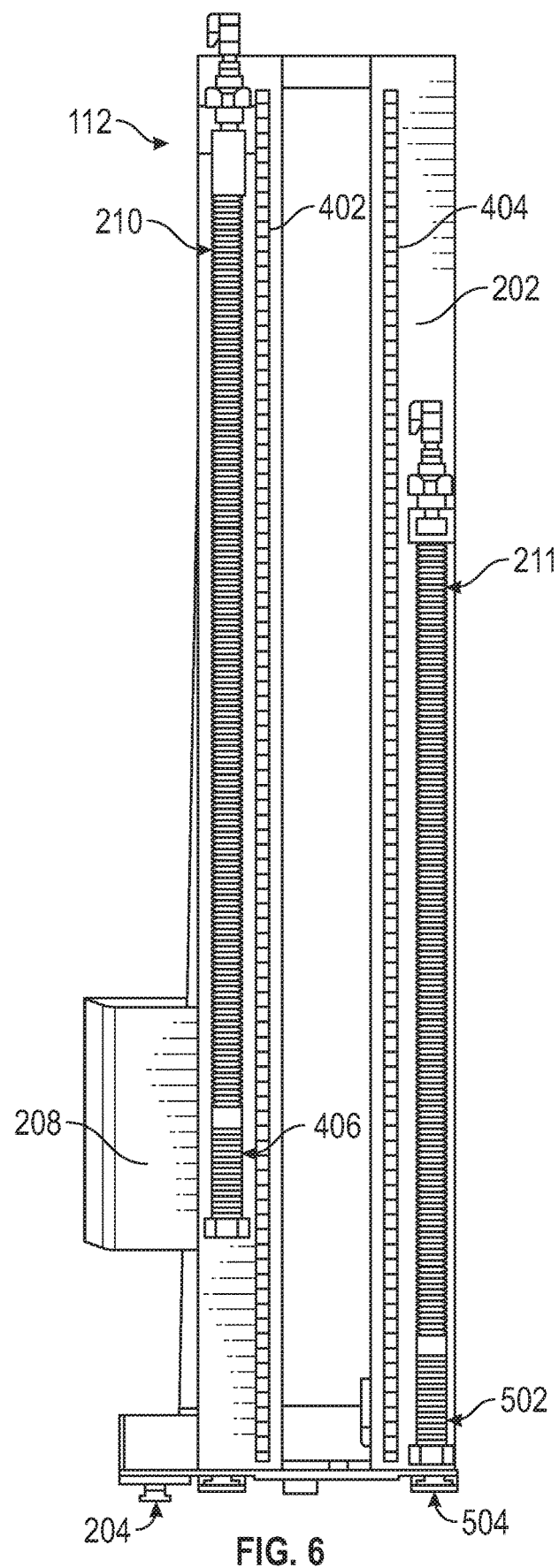
FIG. 6 is an illustration of a front view of a tower, without a pair of end effectors coupled to the tower, in accordance with an example embodiment.

FIG. 6 is an illustration of a front view of tower 112, without pair of end effectors 130 coupled to tower 112, in accordance with an example embodiment. In this illustrative example, rail 402 and rail 404 are more clearly seen. As shown in FIG. 6, movement system 210 is positioned vertically higher than movement system 211.

Thus, movement system 210 ensures that cradle 212 in FIGS. 2-4 may be positioned at a maximum height relative to tower frame 202 that is above the maximum height at which cradle 214 in FIGS. 2, 3, and 5 may be positioned. Similarly, movement system 210 ensures that the lowest height at which cradle 212 in FIGS. 2-4 may be positioned relative to tower frame 202 is above the lowest height at which cradle 214 in FIGS. 2, 3, and 5 may be positioned.

Figure 7:
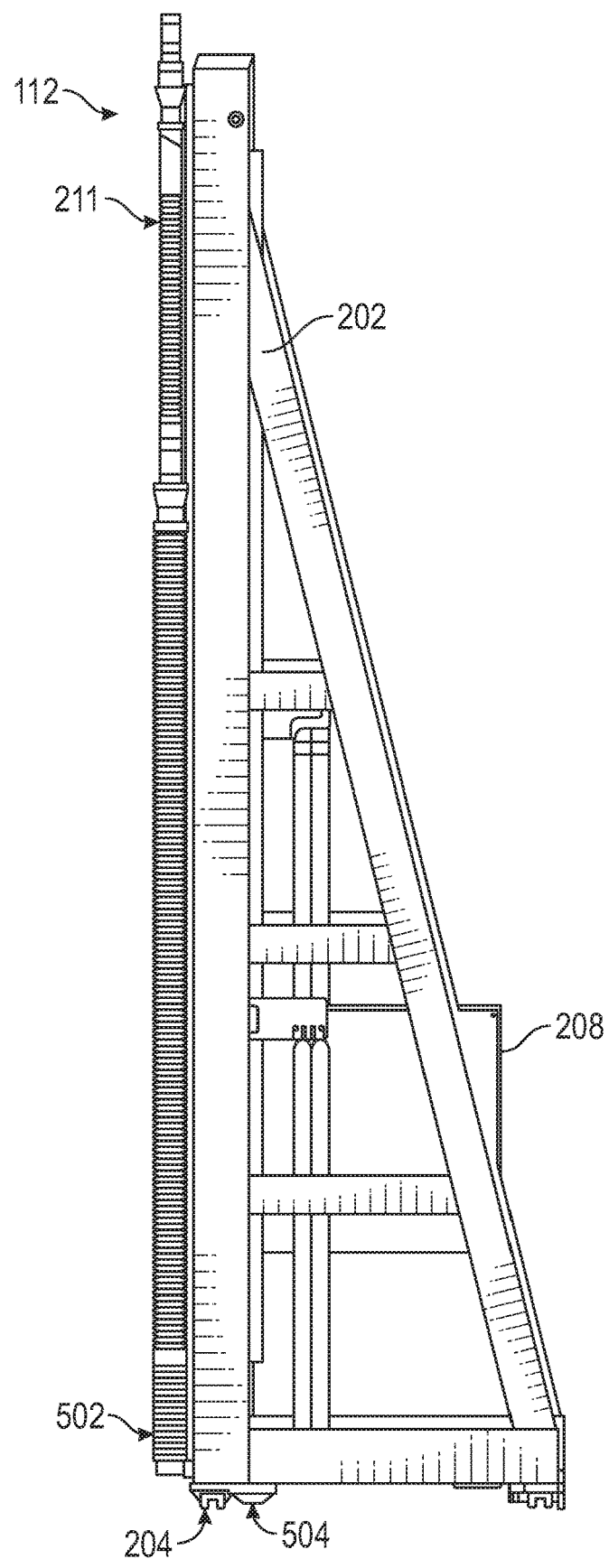
FIG. 7 is an illustration of a side view of the tower, without a pair of end effectors coupled to the tower, in accordance with an example embodiment.

FIG. 7 is an illustration of a side view of tower 112, without pair of end effectors 130 coupled to tower 112, in accordance with an example embodiment. Tower frame 202 has a structure that provides stability to tower 112 despite the vertical height of tower 112 compared to the footprint of tower 112 (e.g., the length-width area taken up by tower 112).

Figure 8:
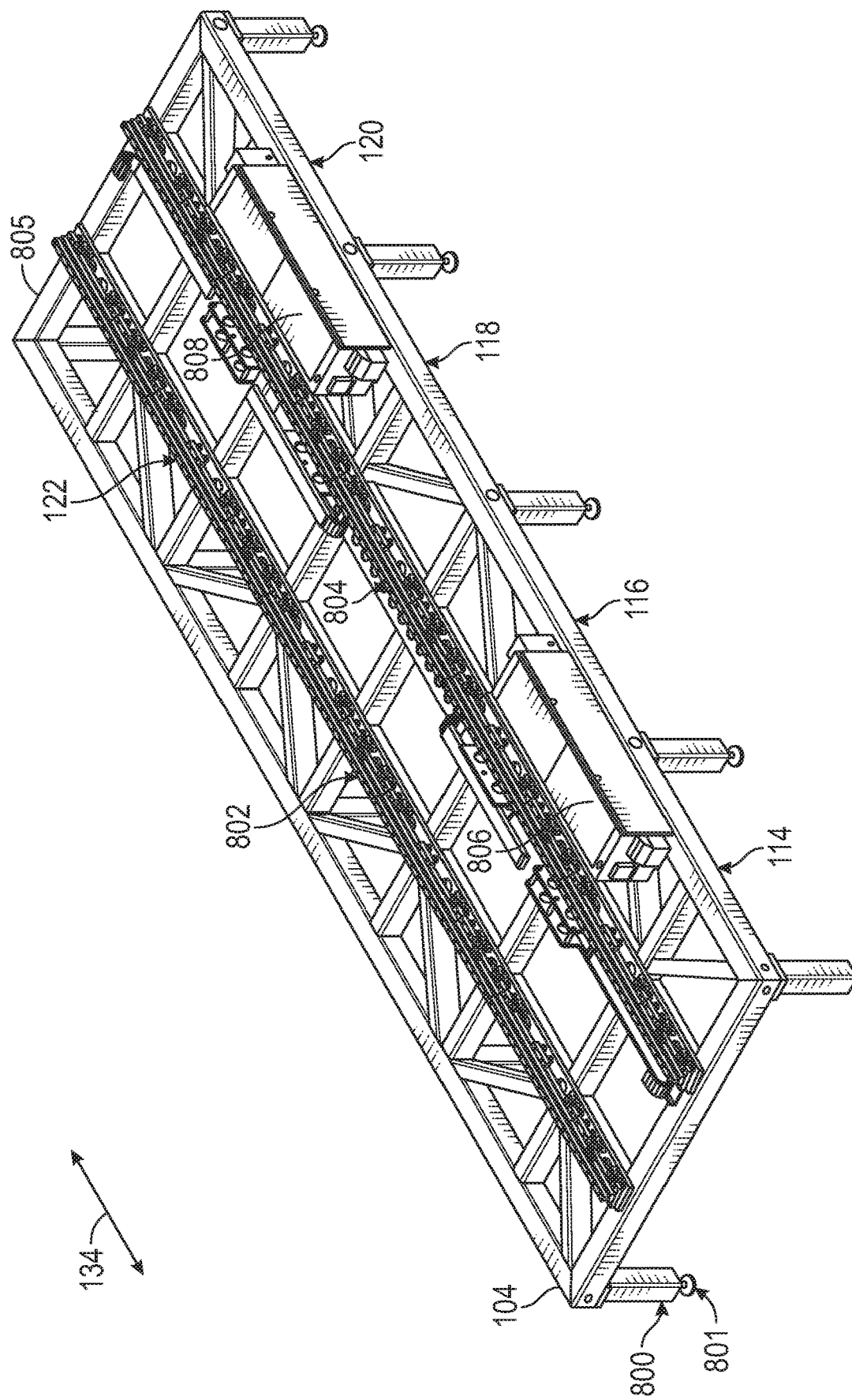
FIG. 8 is an illustration of a perspective front view of the platform structure from FIG. 1 in accordance with an example embodiment.

FIG. 8 is an illustration of a perspective front view of platform structure 104 from FIG. 1 in accordance with an example embodiment. As depicted, platform structure 104 includes portion 114, portion 116, portion 118, and portion 120. Platform structure 104 includes a plurality of legs 800. Legs 800 have levelers 801. Each of levelers 801 is adjustable so that platform structure 104 may be made substantially level with a floor.

Track system 122 includes track 802, track 804, and platform frame 805. Track 802 and track 804 are coupled to platform frame 805.

In this illustrative example, each of track 802 and track 804 spans the entire length of platform structure 104. In other words, each of track 802 and track 804 extends across portion 114, portion 116, portion 118, and portion 120. In other illustrative examples, track system 122 may include a pair of tracks coupled to each of portion 114, portion 116, portion 118, and portion 120.

Platform structure 104 also includes power source 806 and power source 808 coupled to platform frame 805. Power source 806 and power source 808 may take the form of batteries in some illustrative examples.

Power source 806 and power source 808 may be used to provide power to track system 122. In some cases, power source 806 and power source 808 are used to provide power to other components coupled to or integrated as part of platform structure 104. In other illustrative examples, power source 806 and power source 808 are used to provide power to one or more components of towers 102 from FIG. 1 when towers 102 are coupled to platform structure 104.

Figure 9:
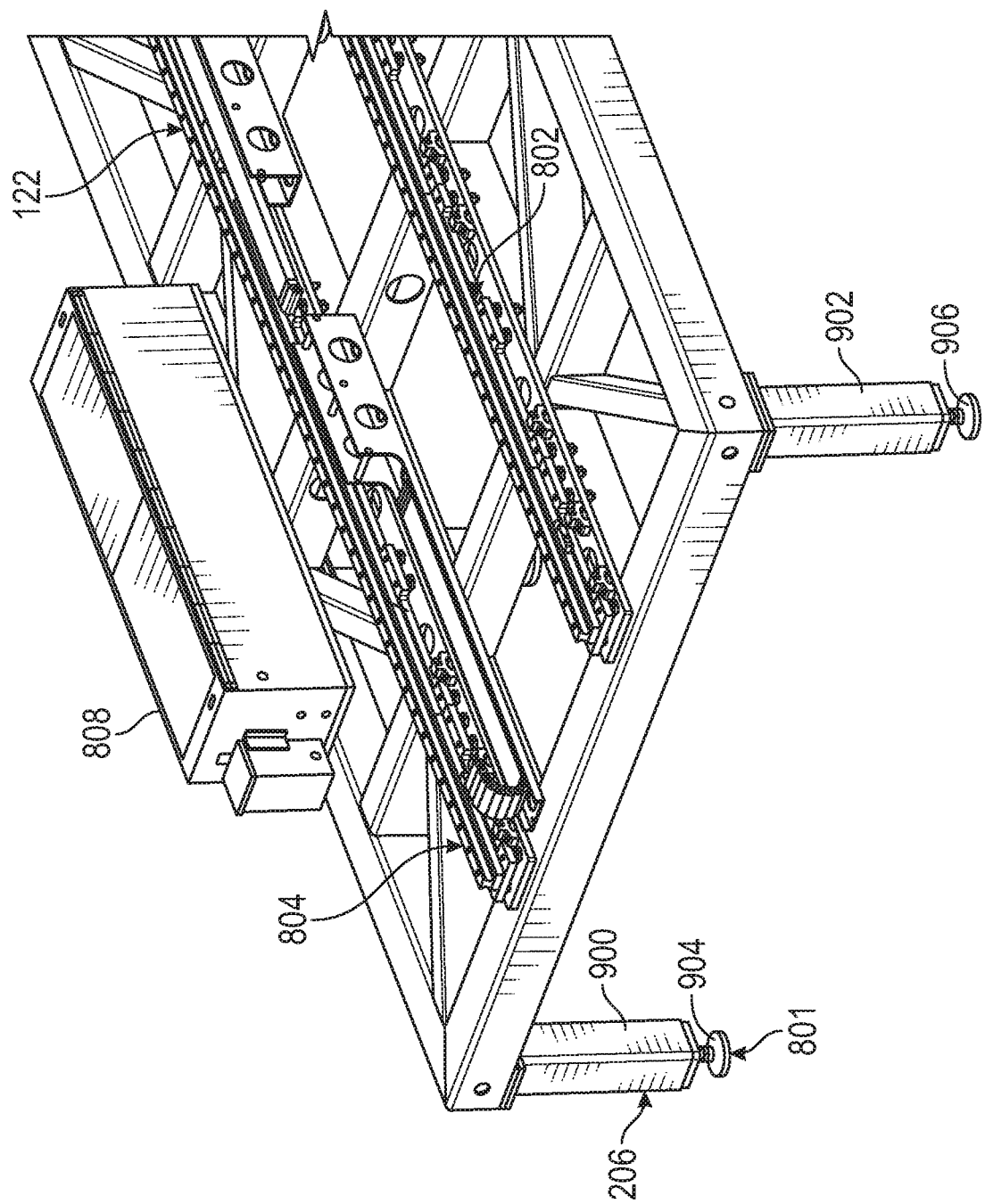
FIG. 9 is an illustration of a perspective back view of an enlarged portion of the platform structure from FIG. 8 in accordance with an example embodiment.

FIG. 9 is an illustration of a perspective back view of an enlarged portion of platform structure 104 from FIG. 8 in accordance with an example embodiment.

Components of track 802 and track 804 are more clearly seen in this view. Leg 900 and leg 902 are examples of legs 800 of platform structure 104. Leg 900 and leg 902 have leveler 904 and leveler 906, respectively.

FIG. 10 is an illustration of end effector 216 from FIGS. 2-4 in accordance with an example embodiment. As previously described, end effector 216 includes arm 220 and engagement system 222.

Arm 220 includes housing 1000 that houses various components including, but not limited to, at least one of a track system, a rail system, a motor, or some other type of movement system. Rail system 1002 is coupled to housing 1000. Rail system 1002 is used for movably coupling end effector 216 to cradle 212 from FIGS. 2-4. For example, end effector 216 may be moved relative to cradle 212 via rail system 1002 in a direction substantially parallel to y-axis 132.

Travel feature 1004, home feature 1006, stop 1007, and stop 1009 are present on at least one side of housing 1000. Travel feature 1004 is used to help further guide movement of end effector 216 relative to cradle 212 in FIGS. 2-4. For example, a sensor system (not shown) coupled to cradle 212 may use travel feature 1004 to determine a current position of end effector 216 relative to cradle 212. Similarly, home feature 1006 is used to guide end effector 216 into a "home" or "default" position relative to cradle 212. For example, the sensor system coupled to cradle 212 may be used to detect home feature 1006 to determine when end effector 216 has been moved into the "home" or "default" position.

Stop 1007 and stop 1009 are used to prevent end effector 216 from extending too far outside of cradle 212, and thereby tower 112, in either direction with respect to y-axis 132.

In one illustrative example, engagement system 222 includes coupling device 1008, load sensor system 1010, and amplifier 1012. Coupling device 1008 is used to engage a fitting coupled to a structure such as panel 136 in FIG. 1. Coupling device 1008 accommodates engagement with fittings of multiple thicknesses, as is further described below. Accordingly, coupling device 1008 may also be referred to as an adjustable coupling device. In some cases, coupling device 1008 may be referred to as an adjustable engager.

Load sensor system 1010 includes one or more sensors for measuring the load along at least one axis. In one illustrative example, load sensor system 1010 include a plurality of load cells for measuring the load or force along at least one of—y-axis 132, z-axis 134, or x-axis 123. Load sensor system 1010, which may include one or more displacement sensors, is used to monitor and limit the forces and/or stresses being applied to the portion of the structure (e.g., panel 136 in FIG. 1) engaged by engagement system 222.

Each end effector of handler system 100 in FIG. 1 may have a load sensor system similar to load sensor system 1010 for use in monitoring the overall forces and/or stresses being applied to the structure with respect to at least one of x-axis 123, y-axis 132, or z-axis 134. This type of monitoring may be used to prevent mechanical components from warping, as well as prevent undesired effects on the structure.

Amplifier 1012 may be used to amplify, or strengthen the one or more signals output by load sensor system 1010 to ensure that the signals are detected or received by, for example, a control system. In these illustrative examples, amplifier 1012 is considered part of engagement system 222. However, in other illustrative examples, amplifier 1012 may be considered part of arm 220 or a separate component attached to arm 220.

FIG. 11 is an illustration of a top view of end effector 216 from FIG. 10 in accordance with an example embodiment. In this view, stop 1009 may be more clearly seen in this view.

Figure 12:
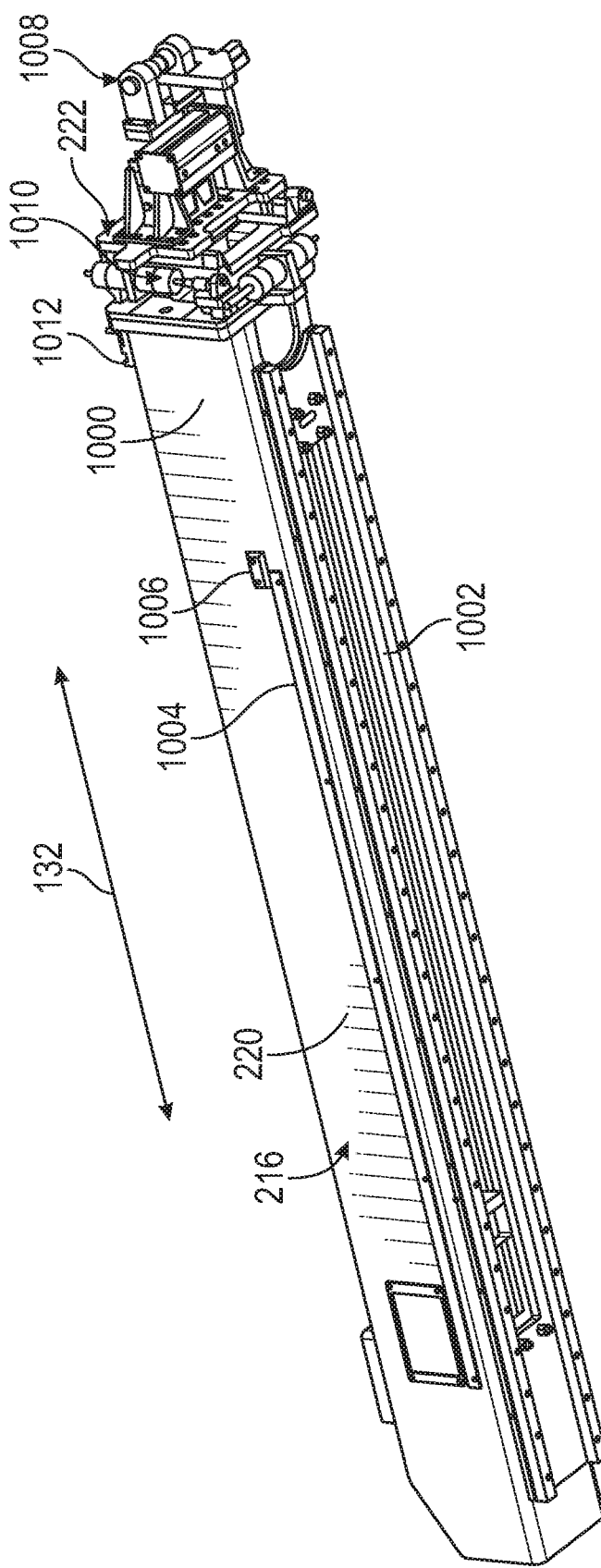
FIG. 12 is an illustration of a bottom perspective view of the end effector from FIGS. 10-11 in accordance with an example embodiment.

FIG. 12 is an illustration of a bottom perspective view of end effector 216 from FIGS. 10-11 in accordance with an example embodiment. Rail system 1002 of end effector 216 is more clearly seen in this view.

Figure 13:
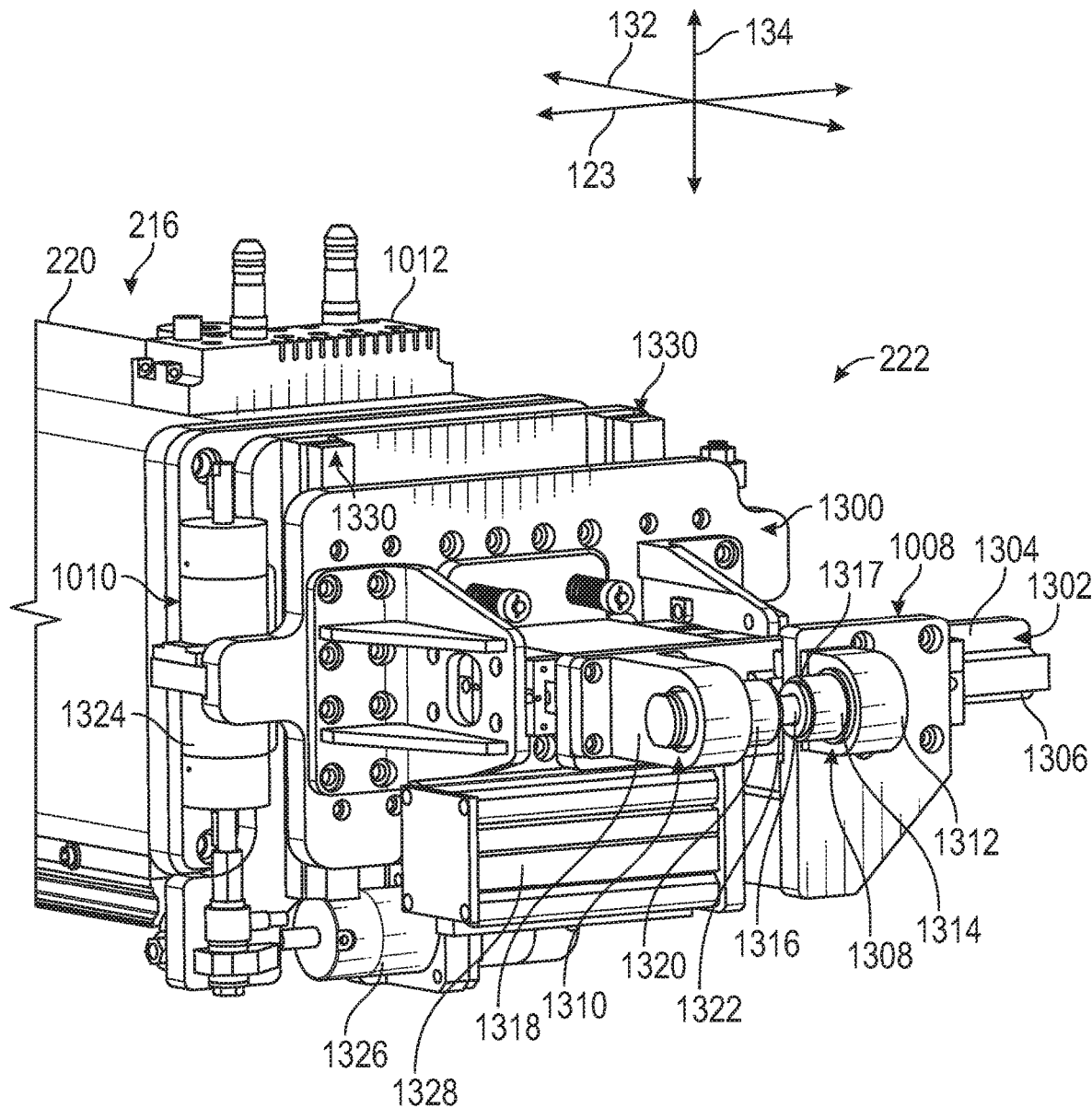
FIG. 13 is an illustration of an enlarged perspective view of an engagement system in accordance with an example embodiment.

FIG. 13 is an illustration of an enlarged perspective view of engagement system 222 in accordance with an example embodiment. Engagement system 222 includes coupling device 1008 and support system 1300. Coupling device 1008 of engagement system 222 includes movement system 1302 and base 1304. Movement system 1302 includes rail 1306.

Coupling device 1008 further includes first engagement device 1308 and second engagement device 1310. In this illustrative example, first engagement device 1308 is coupled to base 1304 relative to a first end of base 1304. In other words, first engagement device 1308 is attached at or near the first end of base 1304. Second engagement device 1310 is coupled to base 1304 relative to a second end of base 1304. In other words, second engagement device 1310 is attached at or near the second end of base 1304. The first end and second end of base 1304 are opposite ends of base 1304 with respect to x-axis 123.

First engagement device 1308 and second engagement device 1310 are used to directly engage a fitting coupled to a structure, such as panel 136 in FIG. 1. In one illustrative example, first engagement device 1308 is movably coupled to base 1304, while second engagement device 1310 is fixedly coupled to base 1304. For example, first engagement device 1308 is movable along rail 1306 relative to base 1304. In particular, first engagement device 1308 may be moved in a direction substantially parallel to x-axis 123 towards second engagement device 1310 while the remaining components of engagement system 222 remain stationary.

First engagement device 1308 includes mount 1312 and first member 1314. First member 1314 has end portion 1316. Although not visible in this view, end portion 1316 is a tapered end portion. In one or more examples, first member 1314 is referred to as a pin having a tapered end portion or as a tapered pin.

In some illustrative examples, stop element 1317 is coupled to first member 1314. Stop element 1317 may take the form of, for example, a washer, a seal, an O-ring, or some other type of stop element. In these illustrative examples, stop element 1317 is comprised of a material that will not scratch or otherwise undesirably affect a surface of a fitting to which coupling device 1008 is coupled. For example, stop element 1317 may be comprised of rubber, silicone, some other type of material, or a combination thereof.

Second engagement device 1310 includes mount 1318 and second member 1320. Although not visible in this view, second member 1320 has a channel that is sized and scaled to receive end portion 1316 of first member 1314. In some illustrative examples, stop element 1322 is coupled to second member 1320. Stop element 1322 may take the form of, for example, a washer, a seal, an O-ring, or some other type of stop element. In these illustrative examples, stop element 1322 is comprised of a material that will not scratch or otherwise undesirably affect a surface of a fitting to which coupling device 1008 is coupled. For example, stop element 1317 may be comprised of rubber, silicone, some other type of material, or a combination thereof.

Support system 1300 includes any number of structures and devices for use in attaching engagement system 222 to arm 220 of end effector 216. For example, support system 1300 includes one or more structural components for coupling, fixedly or movably, engagement system 222 with arm 220.

In some illustrative examples, support system 1300 includes one or more sensors or sensor systems. As one example, support system 1300 includes load sensor system 1010. As previously described, load sensor system 1010 includes one or more sensors for measuring the load along at least one axis. For example, load sensor system 1010 includes one or more load cells for measuring the load or force along at least one of y-axis 132, z-axis 134, or x-axis 123. In this illustrative example, load sensor system 1010 includes load cell 1324 for measuring the load along y-axis 132; load cell 1326 for measuring the load along x-axis 123; and another load cell (not shown in this view) for measuring the load along z-axis 134. In one illustrative example, amplifier 1012 coupled to arm 220 may be used to strengthen the one or more sensor signals received from load sensor system 1010. For example, amplifier 1012 may be used to amplify the output signals from load cell 1324 and load cell 1326.

In one or more illustrative examples, support system 1300 also includes a sensor system for use in guiding operation of coupling device 1008. The sensor system may include at least one of a position sensor, a laser distance sensor, an imaging device, or some other suitable type of sensor. Support system 1300 may also include a sensor system that generates sensor data for use in positioning engagement system 222 relative to arm 220, positioning arm 220 relative to tower 112 described in FIGS. 1-7, positioning arm 220 relative to cradle 212 from FIGS. 2-4 that holds and supports arm 220, or a combination thereof.

Further, support system 1300 includes any number of structures and devices for use in positioning coupling device 1008 relative to a fitting or relative to arm 220. For example, support system 1300 may include a positioning system (not shown) that includes any number of tracks, rails, motors, wheels, other types of movement devices, or combination thereof. Any number of these components may reside within housing unit 1328. Housing unit 1328 may include, for example, without limitation, a motor, a power source (e.g. a battery), a communications device, a sensor, a microprocessor, a controller, or some other type of component.

As depicted, support system 1300 includes plurality of rails 1330. In some illustrative examples, support system 1300 includes a first plurality of rails 1330, a second plurality of rails (not shown) and a third (plurality of rails (not shown) that allow movement of at least a portion of engagement system 222 that includes coupling device 1008 relative to x-axis 123, y-axis 132, and z-axis 134, respectively. In one or more illustrative examples, this movement may be spring-based. For example, one or more springs may provide flexibility such that at least a portion of engagement system 222 that includes coupling device 1008 is movable along a first plurality of rails 1330, a second plurality of rails (not shown) and a third (plurality of rails (not shown) relative to x-axis 123, y-axis 132, and z-axis 134, respectively. In this manner, these pluralities of rails allow refined positioning of coupling device 1008 relative to a fitting. This refined positioning may allow for positioning within tolerances of a few inches (e.g., refined positioning of coupling device 1008 relative to a fitting within a range of about 1-2 inches relative to each of x-axis 123, y-axis 132, and z-axis 134).

Figure 14:
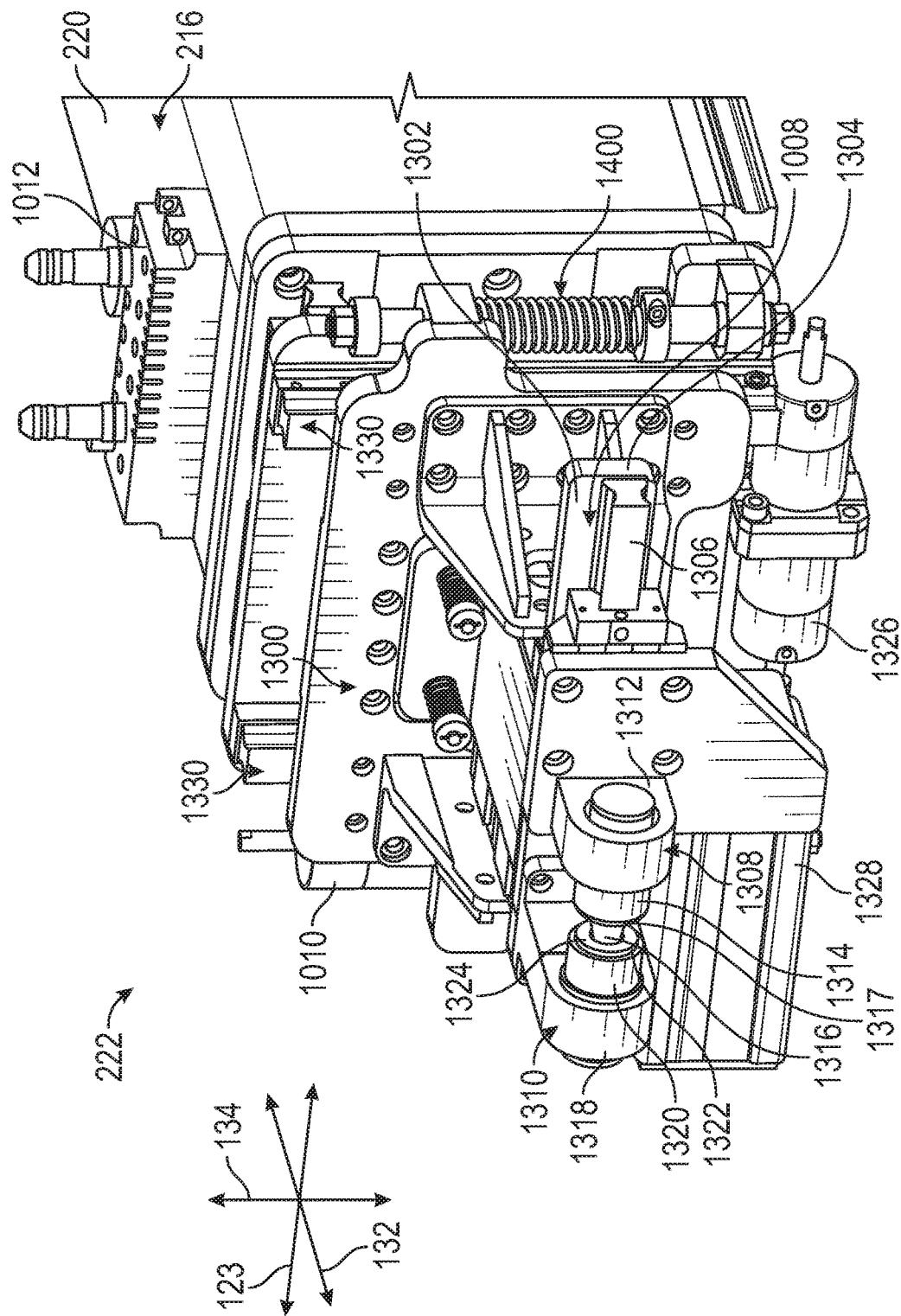
FIG. 14 an illustration of another enlarged perspective view of the engagement system in accordance with an example embodiment.

FIG. 14 an illustration of another enlarged perspective view of engagement system 222 in accordance with an example embodiment. In this illustrative example, first engagement device 1308 and movement system 1302 may be more clearly seen.

Further, spring-loaded positioning system 1400 of support system 1300 is seen in FIG. 14. Spring-loaded positioning system 1400 is an example of one manner in which movement along plurality of rails 1330 may be spring-loaded. In this illustrative example, spring-loaded positioning system 1400 includes at least one spring that allows refined, flexible movement of at least a portion of engagement system 222, and thereby coupling device 1008, along plurality of rails 1330 in a direction substantially parallel to z-axis 134. In other illustrative examples, spring-loaded positioning system 1400 may also include a second spring (not shown) that allows movement along a second plurality of rails (not shown) aligned with x-axis 123 and a third spring (not shown) that allows movement along a third plurality of rails aligned with y-axis 132.

Figure 15:
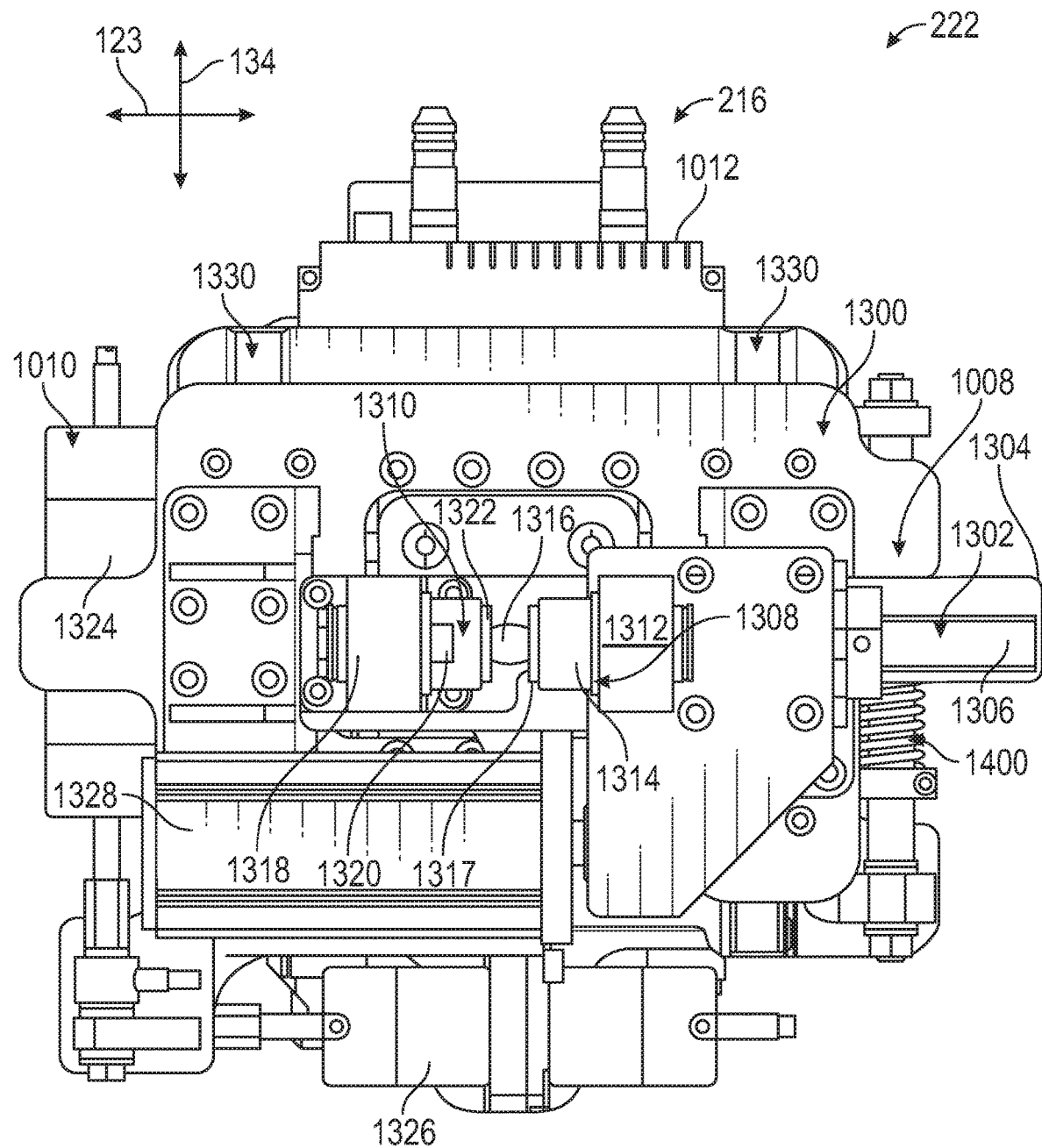
FIG. 15 is an illustration of a front view of the engagement system of an end effector in accordance with an example embodiment.

FIG. 15 is an illustration of a front end view of engagement system 222 of end effector 216 in accordance with an example embodiment. As illustrated, load cell 1324, spring 1400, and plurality of rails 1330 are aligned substantially parallel to z-axis 134. Load cell 1326 is aligned substantially parallel to x-axis 123. Further, first member 1314 and second member 1320 are aligned substantially parallel to x-axis 123. In one illustrative example, first member 1314 and second member 1320 are aligned coaxially.

Figure 16:
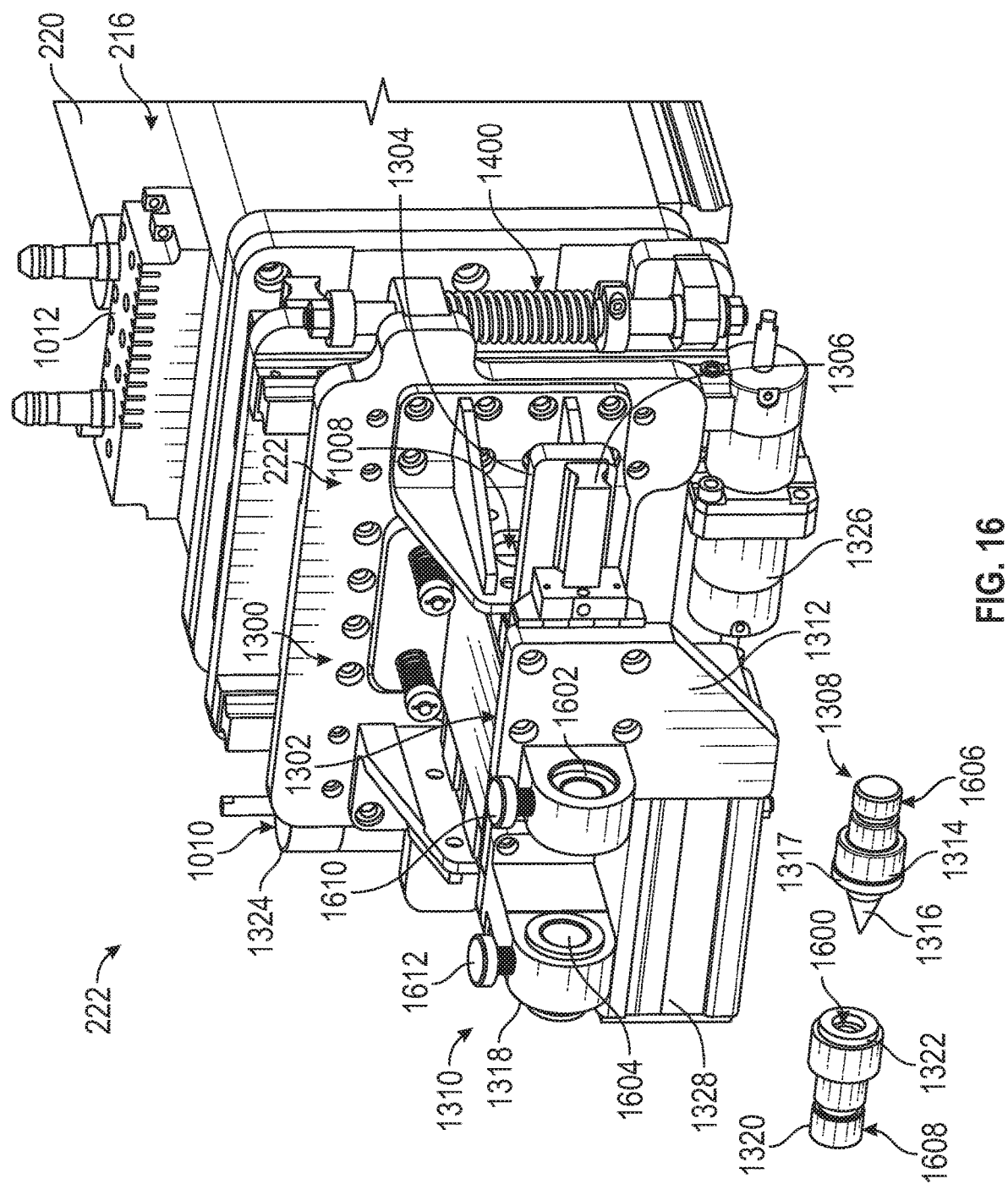
FIG. 16 is an illustration of a partially exploded view of a coupling device in accordance with an example embodiment.

FIG. 16 is an illustration of a partially exploded view of coupling device 1008 in accordance with an example embodiment. In this illustrative example, first member 1314 and second member 1320 have been shown in an exploded manner to allow these members to be more clearly seen. As depicted, end portion 1316 of first member 1314 may be a tapered end portion. In this illustrative example, end portion 1316 is a conically tapered end portion.

Second member 1320 has channel 1600 for receiving end portion 1316. Channel 1600 is sized to allow at least a portion of end portion 1316 channel 1600. In one illustrative example, channel 1600 has a uniform diameter that extends axially through channel 1600. In other illustrative examples, when end portion 1316 is a tapered end portion, channel 1600 may also be conically tapered.

Mount 1312 has an opening through which element 1602 is located. Mount 1318 has an opening through which element 1604 is located. In one illustrative example, element 1602 and element 1604 take the form of bushings that receive and hold first member 1314 and second member 1320, respectively. For example, element 1602 has opening 1603 for receiving first member 1314. Element 1604 has opening 1605 for receiving second member 1320.

In this illustrative example, first member 1314 has end portion 1606 with a smaller diameter as compared to a middle portion of first member 1314. End portion 1606 is received within opening 1603 of element 1602. Similarly, second member 1320 has end portion 1608 with a smaller diameter as compared to an opposite end portion of second member 1320. End portion 1608 is received within opening 1605 of element 1604.

In some illustrative examples, coupling device 1008 includes spring-loaded device 1610 and spring-loaded device 1612 (not shown in previous views). Spring-loaded device 1610 may be used to hold end portion 1606 of first member 1314 within opening 1603 of element 1602. Spring-loaded device 1612 may be used to hold end portion 1608 of second member 1320 within opening 1605 of element 1602. For example, spring-loaded device 1610 may be rotated in one direction to lock end portion 1606 of first member 1314 in place within element 1602 and in another direction to unlock end portion 1606 such that first member 1314 may be removed from element 1602. Similarly, spring-loaded device 1612 may be rotated in one direction to lock end portion 1608 of second member 1320 in place within element 1604 and in another direction to unlock end portion 1608 such that second member 1320 may be removed from element 1604.

Figure 17:
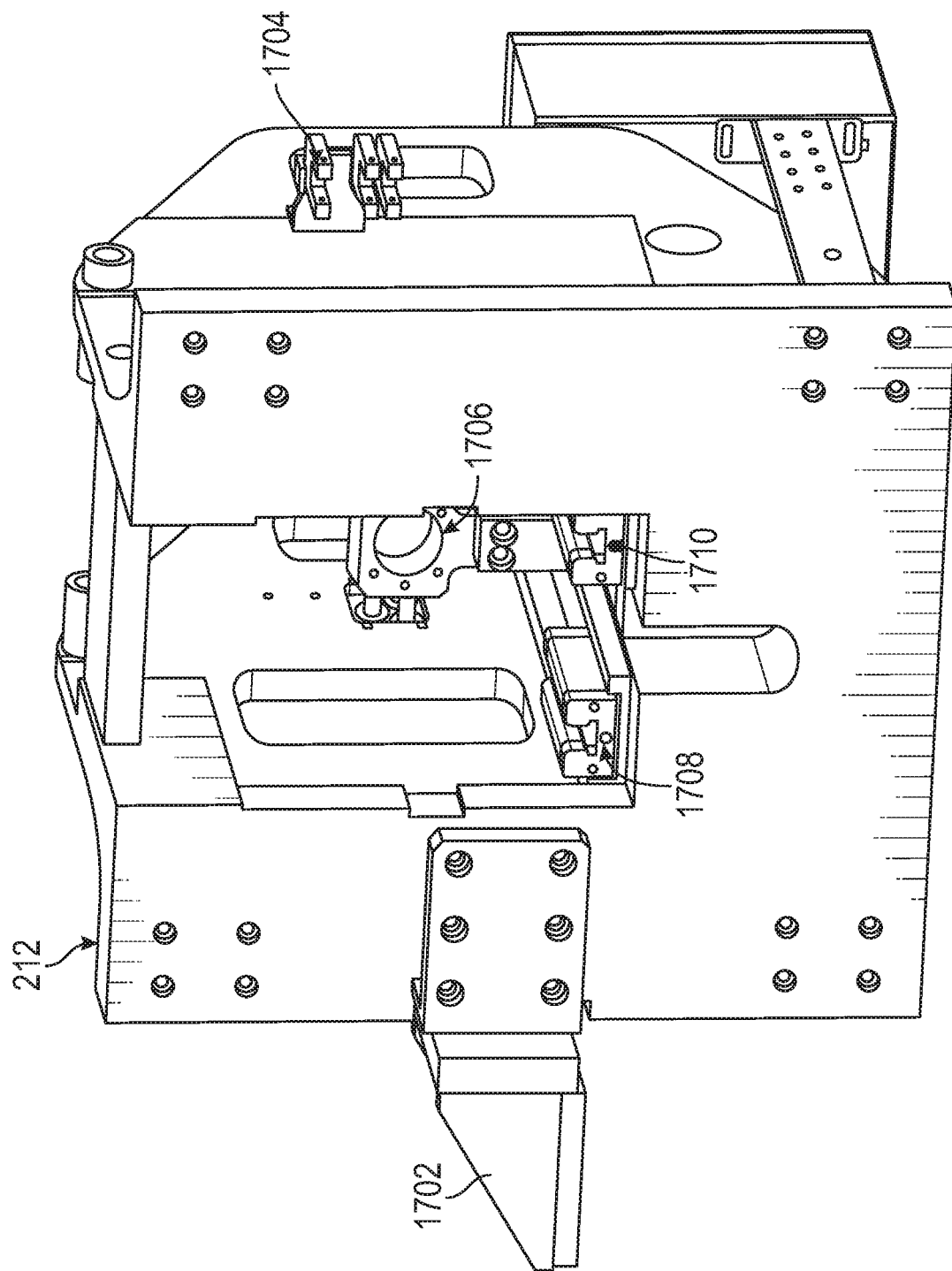
FIG. 17 is an illustration of a front perspective view of the cradle from FIGS. 2-4 in accordance with an example embodiment.

FIG. 17 is an illustration of a front perspective view of cradle 212 from FIGS. 2-4 in accordance with an example embodiment. As depicted, cradle 212 has cradle area 1700 within which arm 220 of end effector 216 may be positioned.

Cradle 212 also includes bracket device 1702 and bracket device 1704. These bracket devices are used to couple cradle 212 to a tower, such as tower 112 in FIGS. 1-2. Specifically, bracket device 1702 couples cradle 212 to movement system 210 of tower 112 as shown in FIGS. 2-4. Movement system 210 from FIG. 2 may be used to manipulate and move cradle 212 in a direction substantially parallel to z-axis 134. In one illustrative example, bracket device 1704 is used to couple cradle 212 to a rail along tower 112, such as rail 404 shown in FIG. 4.

Cradle 212 further includes connector 1706, track system 1708. Track system 1708 includes plurality of tracks 1710 that are capable of receiving rail system 1002 coupled to arm 220 of end effector 216, as shown in FIG. 12. Arm 220 of end effector 216 may be, for example, movable relative to cradle 212 along track system 1708 in a direction substantially parallel to y-axis 132.

In these illustrative examples, cradle 214 from FIGS. 2 and 4 may be implemented in a manner similar to cradle 212. However, cradle 214 may have a bracket device such as bracket device 1702 on the opposite side of cradle 214 as compared to cradle 212. This bracket device allows coupling of cradle 214 to movement system 212 as shown in FIGS. 2, 3, and 5. Further, cradle 214 may have a bracket device such as bracket device 1704 positioned on the opposite side of cradle 214 as compared to cradle 212. This bracket device may be used to couple cradle 214 to a rail along tower 112, such as rail 402 shown in FIGS. 4 and 5.

Figure 18:
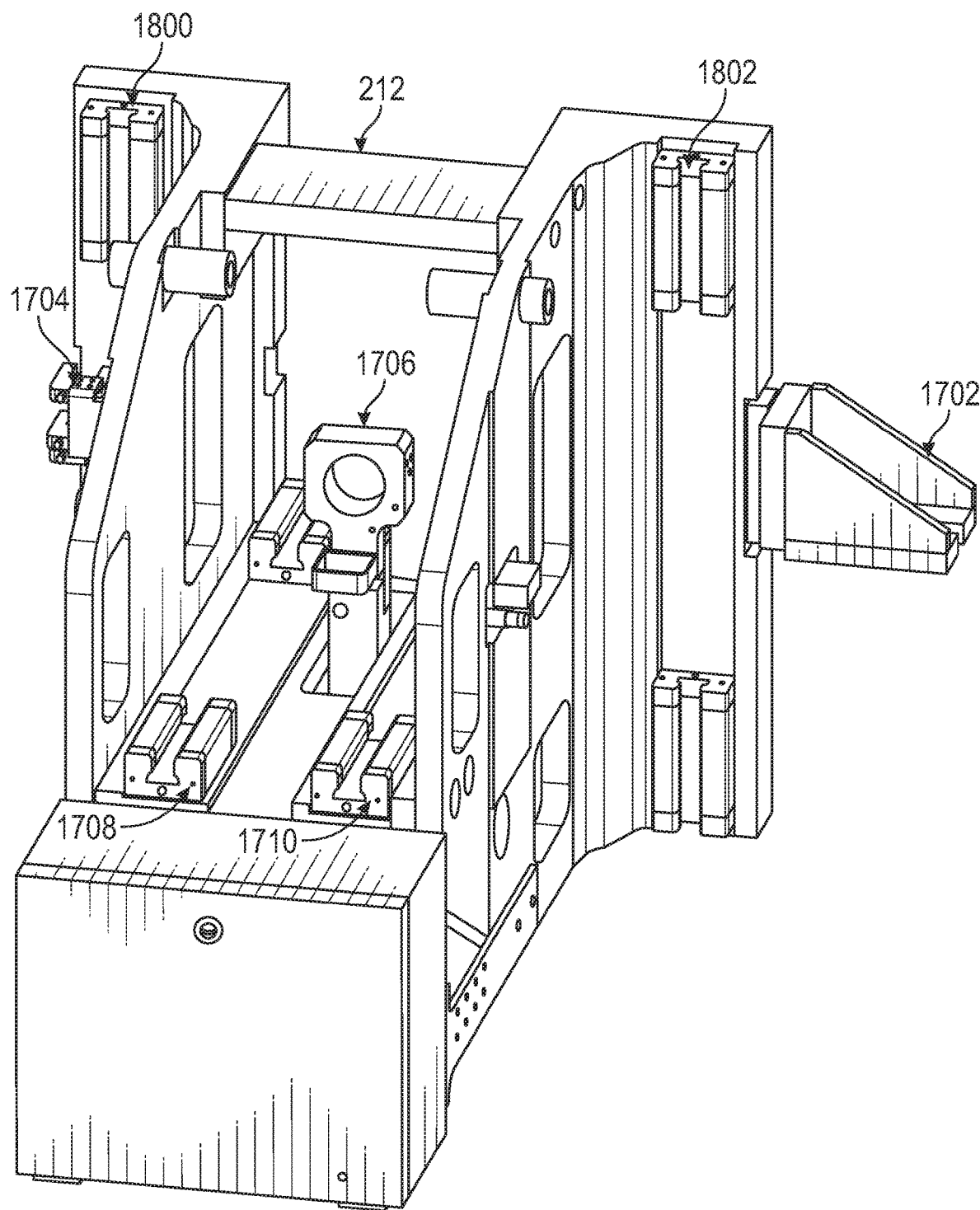
FIG. 18 is an illustration of a back perspective view of the cradle from FIG. 17 in accordance with an example embodiment.

FIG. 18 is an illustration of a back perspective view of cradle 212 from FIG. 17 in accordance with an example embodiment. Track system 1708 may be more clearly seen in this illustrative example. Further, as shown in FIG. 18, cradle 212 may have tracks 1800 and tracks 1802 for receiving rail 404 and rail 402, respectively, on tower 112 as shown in FIG. 4. Tracks 1800 and tracks 1802 help guide movement of cradle 212 relative to tower 112 in the direction substantially parallel to z-axis 134.

Figure 19:
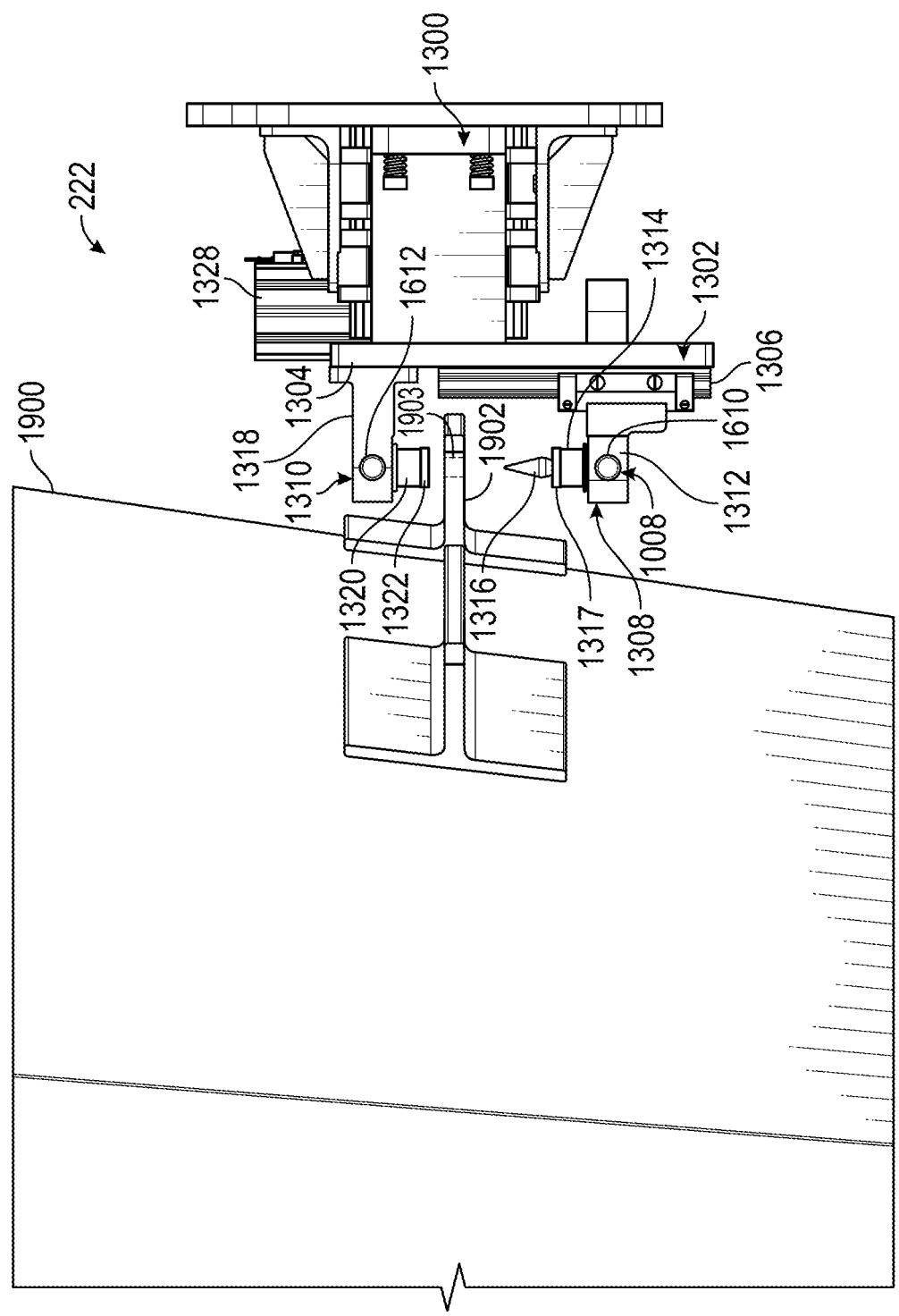
FIG. 19 is an illustration of engaging a fitting with a coupling device in accordance with an example embodiment.
Figure 20:
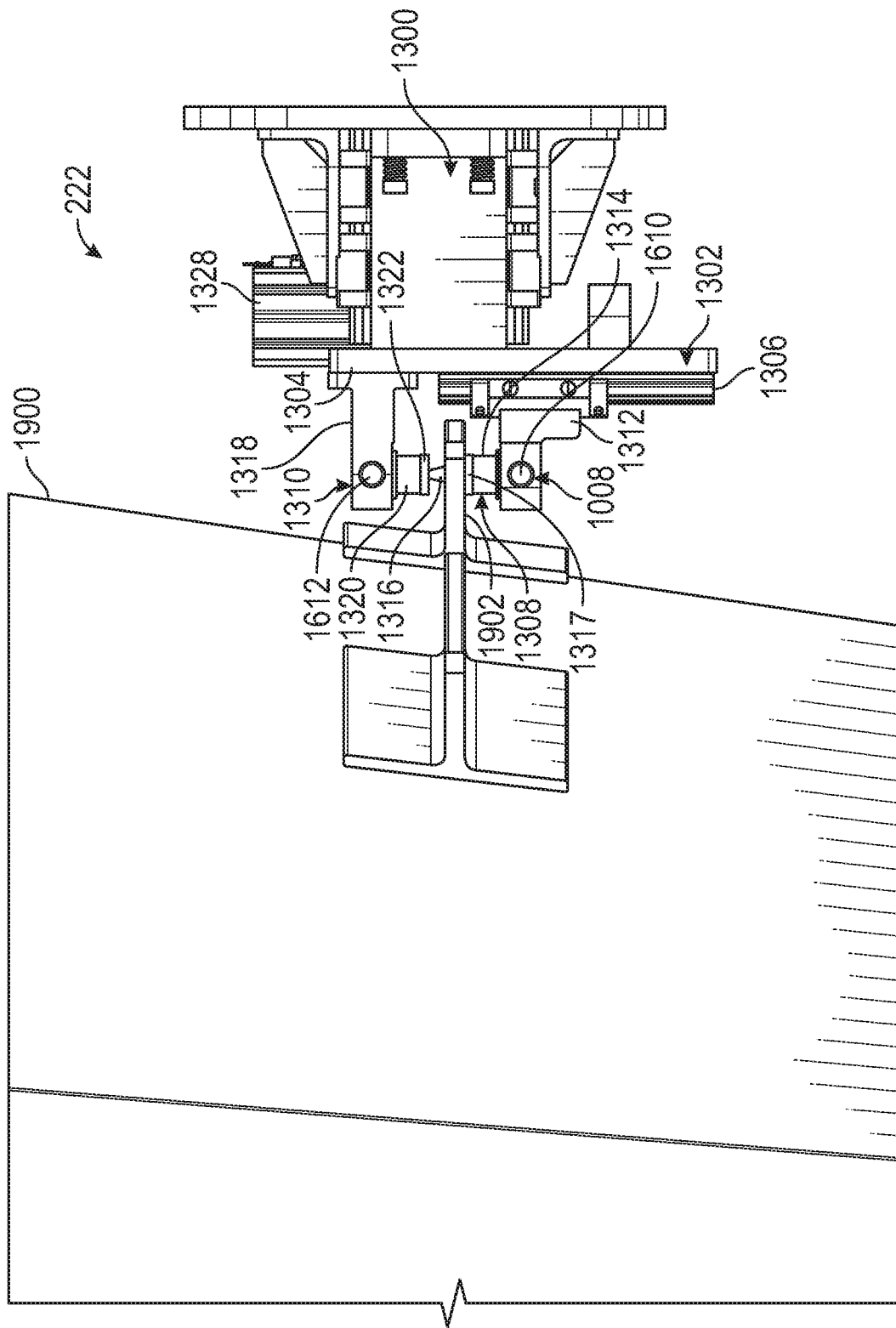
FIG. 20 is an illustration of engaging a fitting with a coupling device in accordance with an example embodiment.

FIGS. 19-20 illustrate the steps involved in engaging a fitting with coupling device 1008 in accordance with an example embodiment. As depicted in FIG. 19, engagement system 222 has been positioned relative to fuselage panel 1900. Fitting 1902 is coupled to fuselage panel 1900. Fuselage panel 1900 is an example of one implementation for a structure and, in particular, a panel such as panel 136 in FIG. 1. In some illustrative examples, fitting 1902 takes the form of a strongback.

Coupling device 1008 positioned around fitting 1902 that is coupled to fuselage panel 1900. Coupling device 1008 is positioned around fitting 1902 such that first engagement device 1308 and second engagement device 1310 are positioned on opposite side of fitting 1902.

In particular, coupling device 1008 is positioned such that first member 1314 and second member 1320 are aligned with each other but on opposite sides of fitting 1902. For example, first member 1314 and second member 1320 may be coaxially aligned with a hole 1903 in fitting 1902. End portion 1316 of first member 1314 is sized to at least partially fit pass through this hole 1903.

To begin engagement of coupling device 1008 with fitting 1902, first engagement device 1308 is moved along rail 1306 relative to base 1304 in the direction of arrow 1904. In this manner, first member 1314 is moved relative to base 1304 in the direction of arrow 1904, which is substantially parallel to x-axis 123, to move end portion 1316 towards the hole in fitting 1902 and such that end portion 1316 passes through the hole in fitting 1902.

End portion 1316 may be moved into a position that is either near channel 1600 (shown in FIG. 16) within second member 1320 or at least partially within channel 1600. In one illustrative example, first member 1314 is moved in the direction of arrow 1904 until a surface of stop element 1317 contacts fitting 1902.

In FIG. 20, stop element 1317 is shown in contact with fitting 1902 such that first engagement device 1308 can no longer be moved in the direction of arrow 1904 in FIG. 19. As shown in FIG. 20, base 1304 may then be moved relative to first engagement device 1308 in the direction of arrow 2000 to move channel 1600 (shown in FIG. 16) further towards end portion 1316 of first member 1314. Base 1304 may be moved in the direction of arrow 2000 until a surface of stop element 1322 contacts fitting 1902. In this manner, a tight fit of fitting 1902 between first engagement device 1308 and second engagement device 1310 is ensured.

Figure 21:
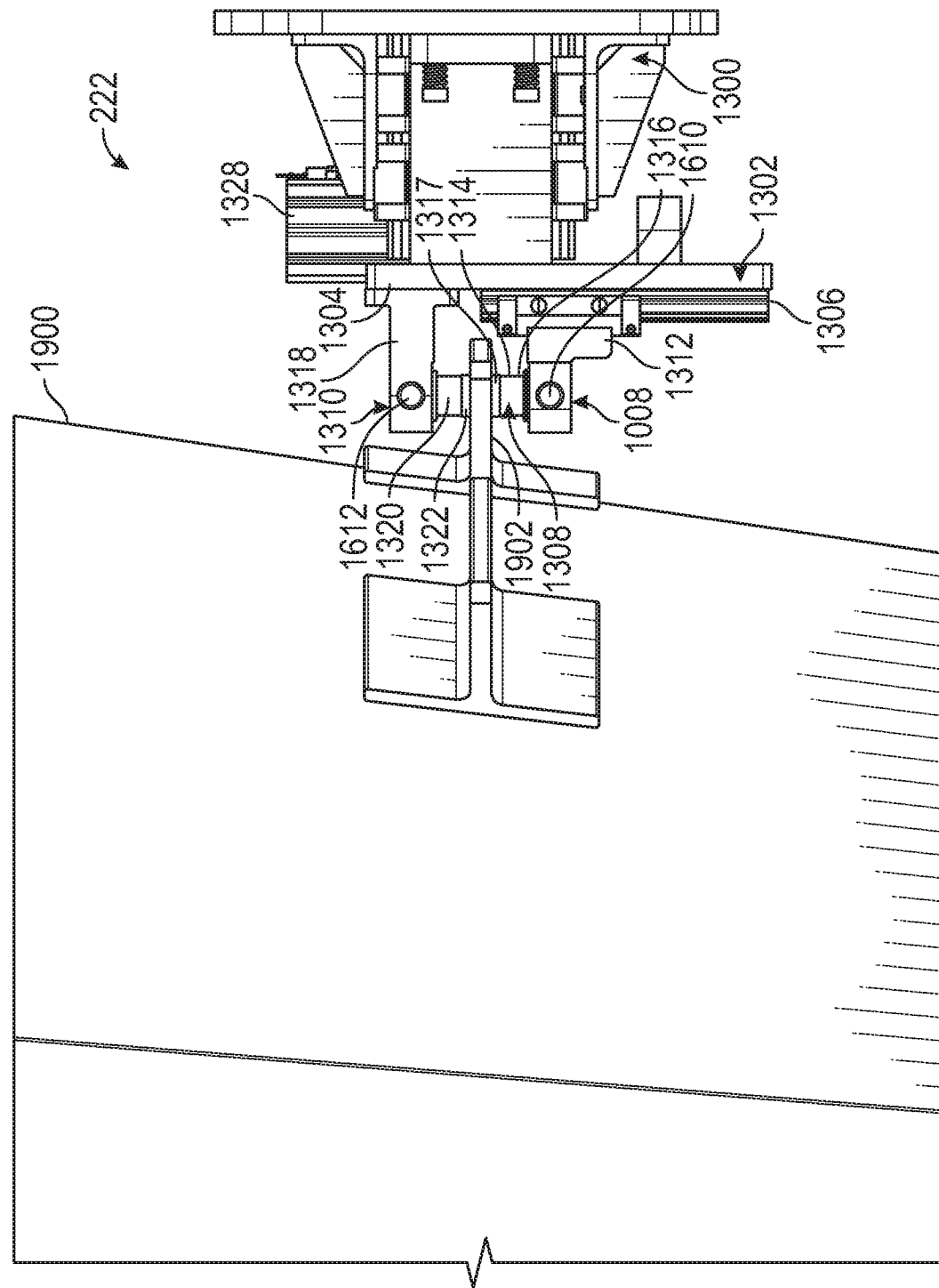
FIG. 21 is an illustration of engaging a fitting with a coupling device in accordance with an example embodiment.

In FIG. 21, the tight fit of fitting 1902 between first engagement device 1308 and second engagement device 1310 is illustrated. Once this tight fit has been achieved, a state of coupling device 1008 is considered locked so that no further movement of any of the components of coupling device 1008 is allowed during the transport of fuselage panel 1900. Locking the state of coupling device 1008 ensures that the tight fit is maintained during transport.

The illustrations of handler system 100 in FIG. 1 and the various components of handler system 100 in FIGS. 2-21 are not meant to imply physical or architectural limitations to the manner in which an example embodiment may be implemented. Other components in addition to or in place of the ones illustrated may be used. Some components may be optional.

For example, although control of handler system 100 has been described as being automated via a control system, certain tasks may be manually controlled. In some illustrative examples, a human operator may control movement or operation of one or more components of handler system 100 using a graphical user interface displayed on a computer, laptop, tablet or some other device.

In one or more illustrative examples, the graphical user interface may be used to provide information being output by the one or more sensor devices and sensor systems of handler system 100. In this manner, the human operator may be able to monitor the automated operations of the handler system 100. The human operator may monitor, for example, the output of load sensor system 1010 in FIG. 10 to determine whether the loads are within or outside of selected tolerances.

Figure 22:
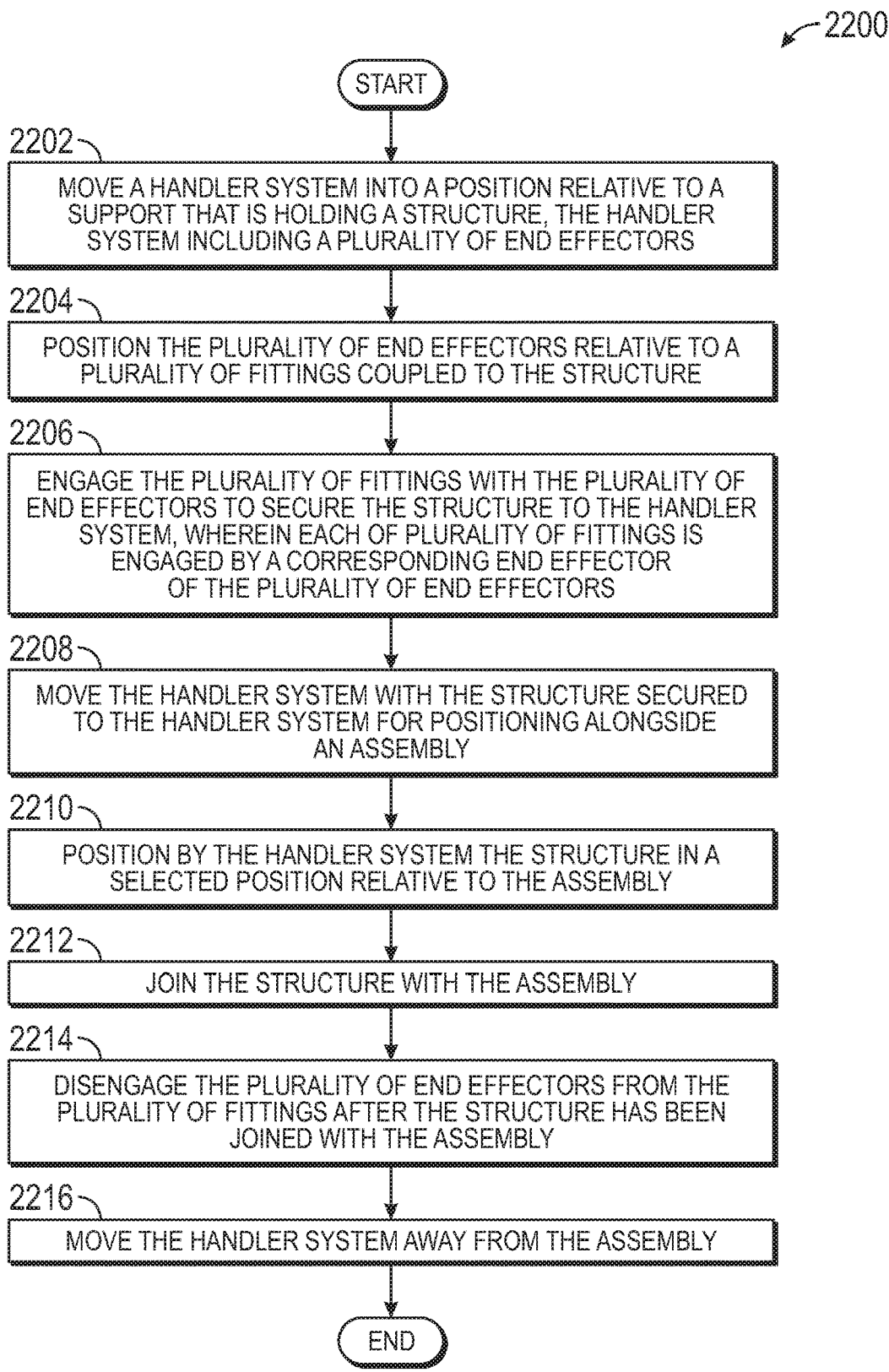
FIG. 22 is a flowchart of a process for automated engagement and handling of a structure in accordance with an example embodiment.

FIG. 22 is a flowchart of a process for automated engagement and handling of a structure in accordance with an example embodiment. Process 2200 illustrated in FIG. 22 may be implemented using handler system 100 described in FIGS. 1-21.

Process 2200 may begin by moving a handler system into a position relative to a support that is holding a structure, the handler system including a plurality of end effectors (operation 2202). In operation 2202, the handler system 100 may be handler system 100 in FIG. 1 and the plurality of end effectors may include pair of end effectors 124, pair of end effectors 126, pair of end effectors 128, and pair of end effectors 130 in FIG. 1. The structure may be, for example, panel 136 in FIG. 1.

The plurality of end effectors is positioned relative to a plurality of fittings coupled to the structure (operation 2204). In operation 2204, the plurality of fittings may include, for example, fittings 137 shown in FIG. 1. This positioning may be performed using, for example, distance recognition and machine learning. In one illustrative example, a laser guidance system comprising any number of laser distance sensors may be used to help position the plurality of end effectors relative to the plurality of fittings. For example, each end effector may have one or more laser distance sensors coupled to the end effector.

The plurality of fittings is engaged with the plurality of end effectors to secure the structure to the handler system, wherein each of the plurality of fittings is engaged by a corresponding end effector of the plurality of end effectors (operation 2206). In these illustrative examples, a load sensor system may be used to monitor the forces and/or stresses being applied to the structure by the plurality of end effectors. In some cases, the plurality of end effectors may provide load alleviation in order to ensure that no one particular point on the structure is overloaded or overstressed.

Thereafter, the handler system is moved with the structure secured to the handler system for positioning alongside an assembly (operation 2208). Operation 2208 includes moving the handler system away from the support. Next the handler system positions the structure in a selected position relative to the assembly (operation 2210). The assembly may be, for example, a fuselage assembly. Operation 2210 may be performed in different ways. In one illustrative example, operation 2210 may be performed using the laser guidance system described above to guide the structure into the selected position. For example, a number of laser distance sensors, imaging devices, or both may be used to control operation of each of the plurality of end effectors for positioning the structure into the selected position relative to the assembly.

In one or more illustrative examples, process 2200 may be part of a determinate assembly process. In these examples, operation 2210 may include positioning the structure in a selected position with respect to determinate assembly holes present in at least one of the structure and the assembly.

The structure is then joined to the assembly (operation 2212). In some illustrative examples, operation 2212 may be performed by installing fasteners at locations marked by determinate assembly holes. Thereafter, the plurality of end effectors is disengaged from the plurality of fittings after the structure has been joined with the assembly (operation 2214). The handler system is then moved away from the assembly (operation 2216), with the process terminating thereafter.

Figure 23:
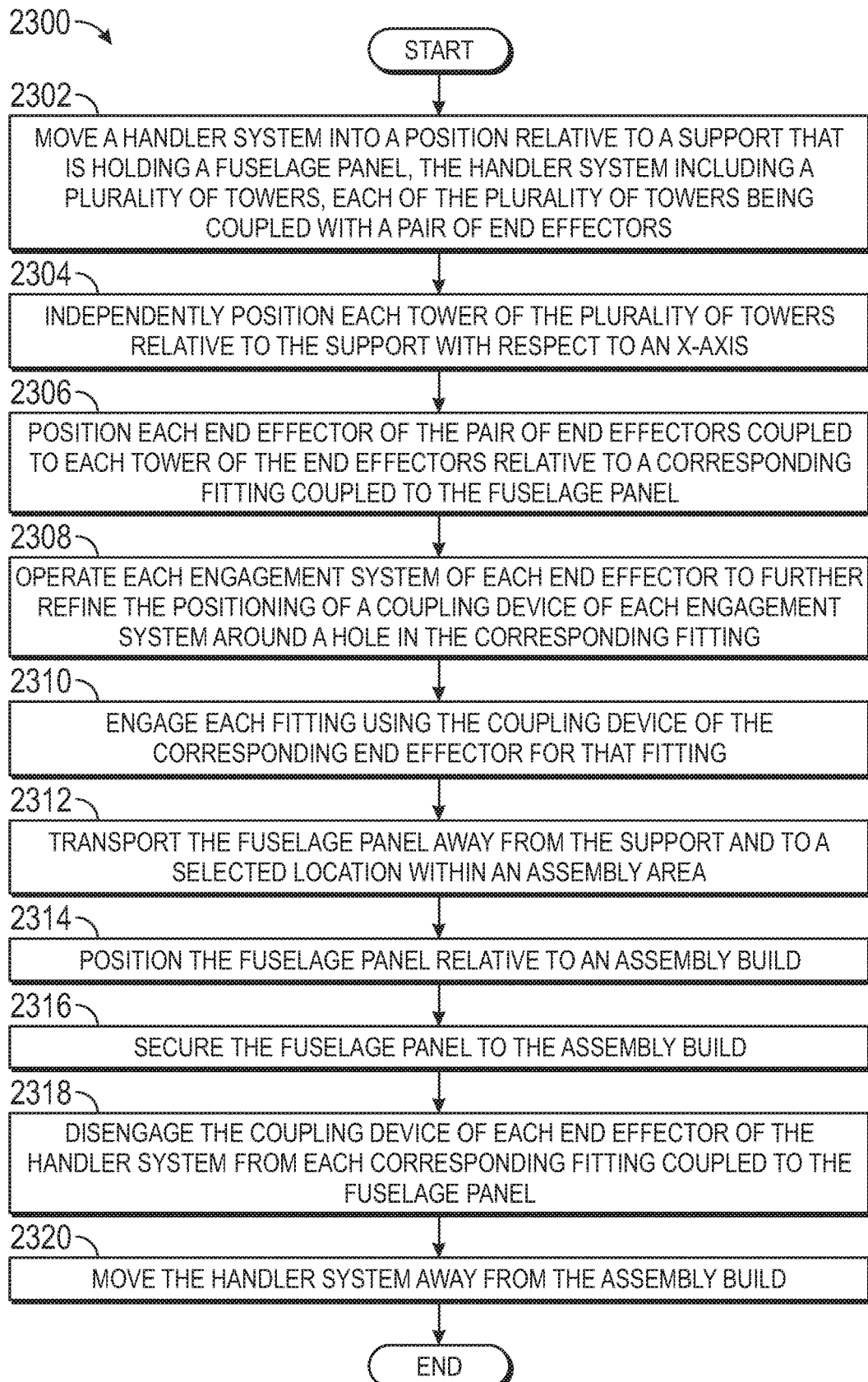
FIG. 23 is a flowchart of a process for automated engagement and handling of a fuselage panel in accordance with an example embodiment.

FIG. 23 is a flowchart of a process for automated engagement and handling of a fuselage panel in accordance with an example embodiment. Process 2300 illustrated in FIG. 23 may be implemented using handler system 100 described in FIGS. 1-21.

Process 2300 may begin by moving a handler system into a position relative to a support that is holding the fuselage panel, the handler system including a plurality of towers, each tower being coupled with a pair of end effectors (operation 2302). In this illustrative example, the handler system may be handler system 100 in FIG. 1 and the plurality of towers may be plurality of towers 102 from FIG. 1.

Each tower of the plurality of towers is independently positioned relative to the support with respect to an x-axis (operation 2304). For example, each of the plurality of towers may be moved substantially parallel to the x-axis along a track system on the platform structure to which the plurality of towers is coupled. The platform structure may be platform structure 104 in FIG. 1.

Thereafter, each end effector of the pair of end effectors coupled to each tower of the end effectors is positioned relative to a corresponding fitting coupled to the fuselage panel (operation 2306). The positioning in operation 2306 may be performed with respect to at least the y-axis. For example, each end effector may be moved relative to the tower to which the end effector is coupled in at least one of a direction substantially parallel to the y-axis and a direction substantially parallel to the x-axis.

Each engagement system of each end effector is operated to further refine the positioning of a coupling device of each engagement system around a hole in the corresponding fitting (operation 2308). Each fitting is then engaged using the coupling device of the corresponding end effector for that fitting (operation 2310). Operation 2310 may be performed in a manner similar to the engagement shown in FIGS. 19-21 above.

The fuselage panel is then transported away from the support and to a selected location within an assembly area (operation 2312). Operation 2312 may be performed using one or more automated guided vehicles coupled to the platform structure.

The fuselage panel is positioned relative to an assembly build (operation 2314). The assembly build may be, for example, the build for a fuselage assembly. In these illustrative examples, his positioning may be performed using a laser guidance system.

Thereafter the fuselage panel is secured to the assembly build (operation 2316). The coupling device of each end effector of the handler system is then disengaged from each corresponding fitting coupled to the fuselage panel (operation 2318). The handler system is moved away from the assembly build (operation 2320), with the process terminating thereafter. In operation 2320, the handler system may be further moved out of the assembly area.

Figure 24:
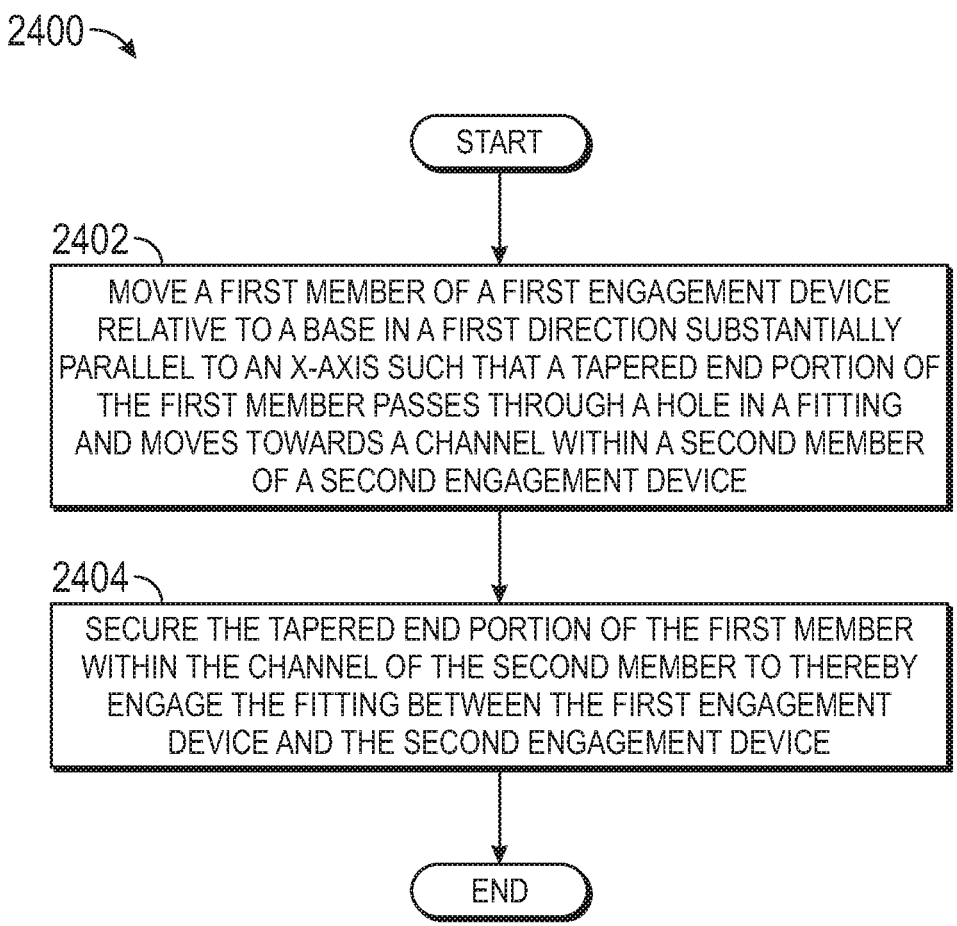
FIG. 24 is a flowchart of a method for performing automated engagement of a fitting coupled to a structure in accordance with an example embodiment.

FIG. 24 is a flowchart of a method for performing automated engagement of a fitting coupled to a structure in accordance with an example embodiment. Process 2400 illustrated in FIG. 24 may be implemented using handler system 100 described in FIGS. 1-21. In particular, process 2400 may be implemented using engagement system 222 having coupling device 1008 as shown in FIGS. 10-16 and 19-21. Further, process 2400 may be used in the implementation of operation 2206 of process 2200 in FIG. 22 and operation 2310 of process 2300 in FIG. 23 may be performed.

Process 2400 includes moving a first member of a first engagement device relative to a base in a first direction substantially parallel to an x-axis such that a tapered end portion of the first member passes through a hole in a fitting and moves towards a channel within a second member of a second engagement device (operation 2402). In operation 2402, the first and second engagement devices may be first engagement device 1308 and second engagement device 1310, respectively, as shown in FIG. 13. Operation 2402 may include the first member of the first engagement device is moved through a hole in the fitting towards a channel within a second member of the second engagement device.

The tapered end portion of the first member is secured within the channel to thereby engage the fitting between the first engagement device and the second engagement device (operation 2404), with the process terminating thereafter. Operation 2404 may be performed in a number of different ways. For example, the base may be moved in a second direction that is opposite the first direction and is substantially parallel to the x-axis such that the base is moved relative to the first engagement device and thereby, relative to the first member, and such that the tapered end portion of the first member is secured within the channel of the second member. Further, in some examples, operation 2404 includes providing the tight fit of the fitting between a stop element (e.g., a first washer) coupled to the first member and a stop element (e.g., a second washer) coupled to the second member.

Figure 25:
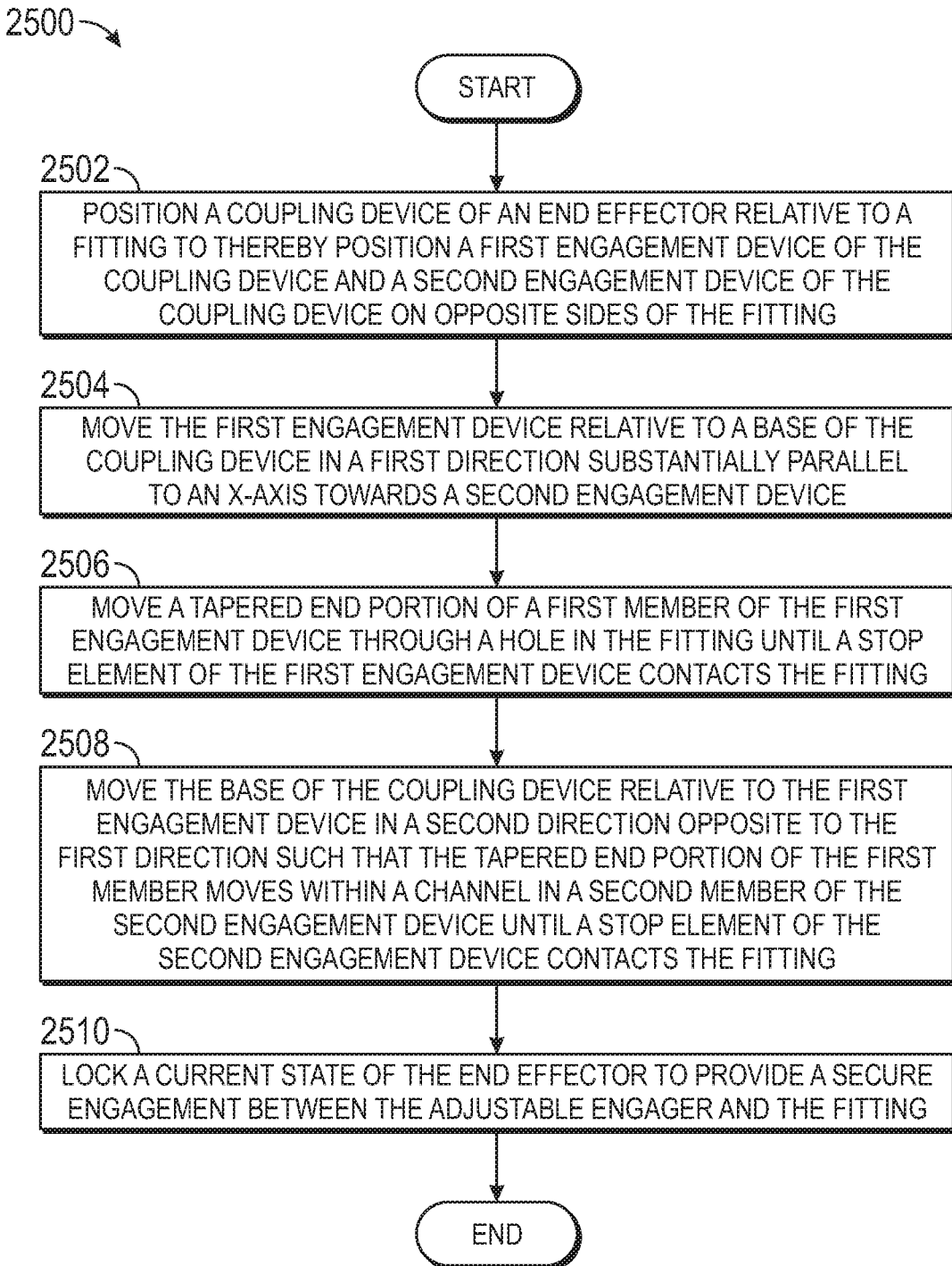
FIG. 25 is a flowchart of a method for performing automated engagement of a fitting coupled to a structure in accordance with an example embodiment.

FIG. 25 is a flowchart of a method for performing automated engagement of a fitting coupled to a structure in accordance with an example embodiment. Process 2500 illustrated in FIG. 25 may be implemented using handler system 100 described in FIGS. 1-21. In particular, process 2500 may be implemented using engagement system 222 having coupling device 1008 as shown in FIGS. 10-16 and 19-21. Further, process 2500 may be used in the implementation of operation 2206 of process 2200 in FIG. 22 and operation 2310 of process 2300 in FIG. 23 may be performed.

Process 2500 includes positioning a coupling device of an end effector relative to the fitting to thereby position a first engagement device of the coupling device and a second engagement device of the coupling device on opposite sides of a hole in the fitting (operation 2502). Thereafter, a first member of the first engagement device is moved relative to a base of the coupling device in a first direction substantially parallel to an x-axis (operation 2504). A tapered end portion of the first member of the first engagement device is moved through the hole in the fitting until a stop element of the first engagement device contacts the fitting (operation 2506).

Next, the base of the coupling device is moved relative to the first engagement device in a second direction opposite to the first direction such that the tapered end portion of the first member moves within a channel in a second member of the second engagement device until a stop element of the second engagement device contacts the fitting (operation 2508). A current state of the coupling device is locked to provide a secure engagement between the coupling device and the fitting (operation 2510), with the process terminating thereafter.

Figure 26:
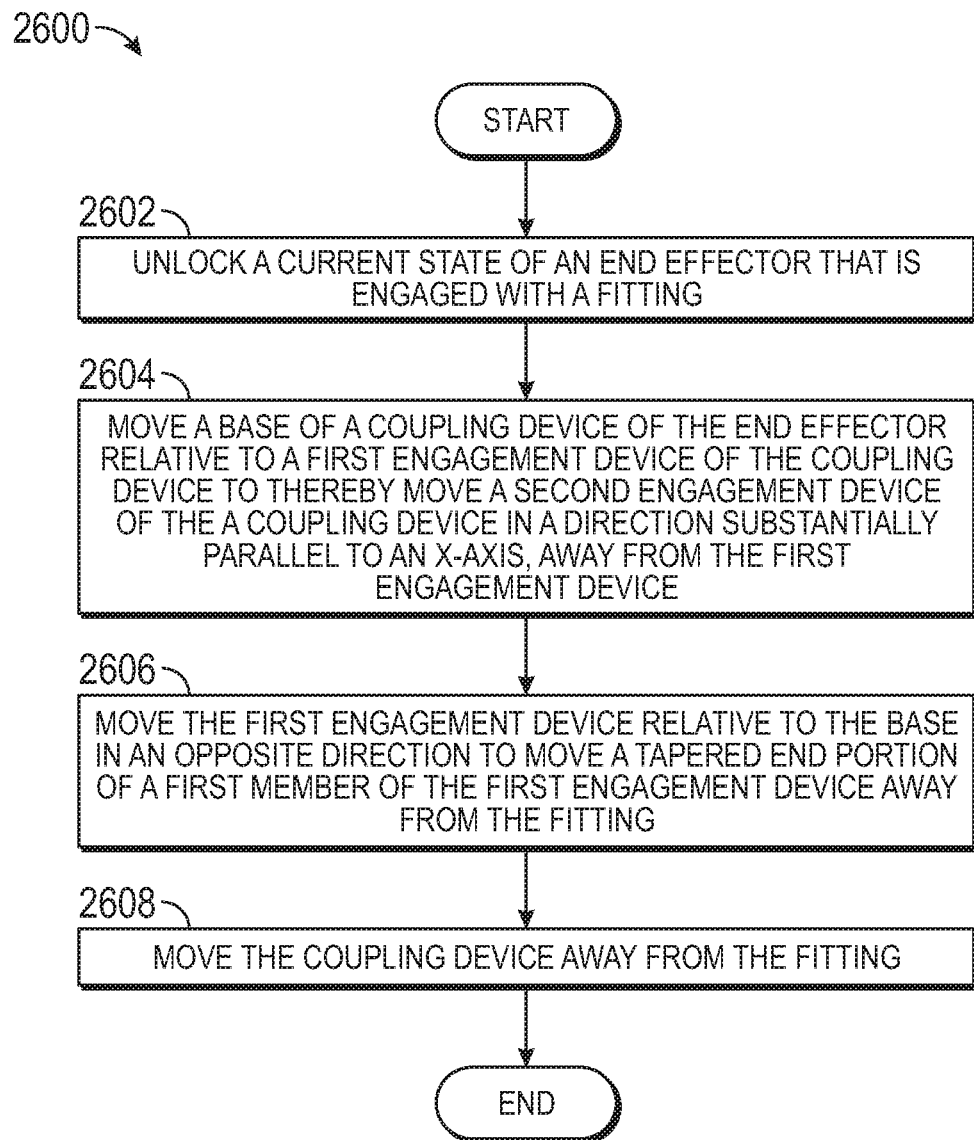
FIG. 26 is a flowchart of a method for disengaging a fitting from a coupling device in accordance with an example embodiment.

FIG. 26 is a flowchart of a method for disengaging a fitting from a coupling device in accordance with an example embodiment. Process 2600 illustrated in FIG. 26 may be implemented to disengage a fitting, such as fitting 1902 in FIG. 19, from a coupling device, such as coupling device described in FIGS. 10-16 and 19-21. In particular, process 2600 may be implemented using engagement system 222 having coupling device 1008 as shown in FIGS. 10-16 and 19-21. Further, process 2600 may be used in the implementation of operation 2214 of process 2200 in FIG. 22 and operation 2318 of process 2300 in FIG. 23 may be performed.

Process 2600 begins by unlocking a current state of a coupling device of an end effector that is engaged with a fitting (operation 2602). Thereafter, a base of the coupling device is moved relative to a first engagement device of the coupling device to thereby move a second engagement device of the coupling device in a direction substantially parallel to an x-axis, away from the first engagement device (operation 2604).

The first engagement device is moved relative to the base in an opposite direction to move a tapered end portion of a first member of the first engagement device away from the fitting (operation 2606). The coupling device is then moved away from the fitting (operation 2608), with the process terminating thereafter.

Figure 27:
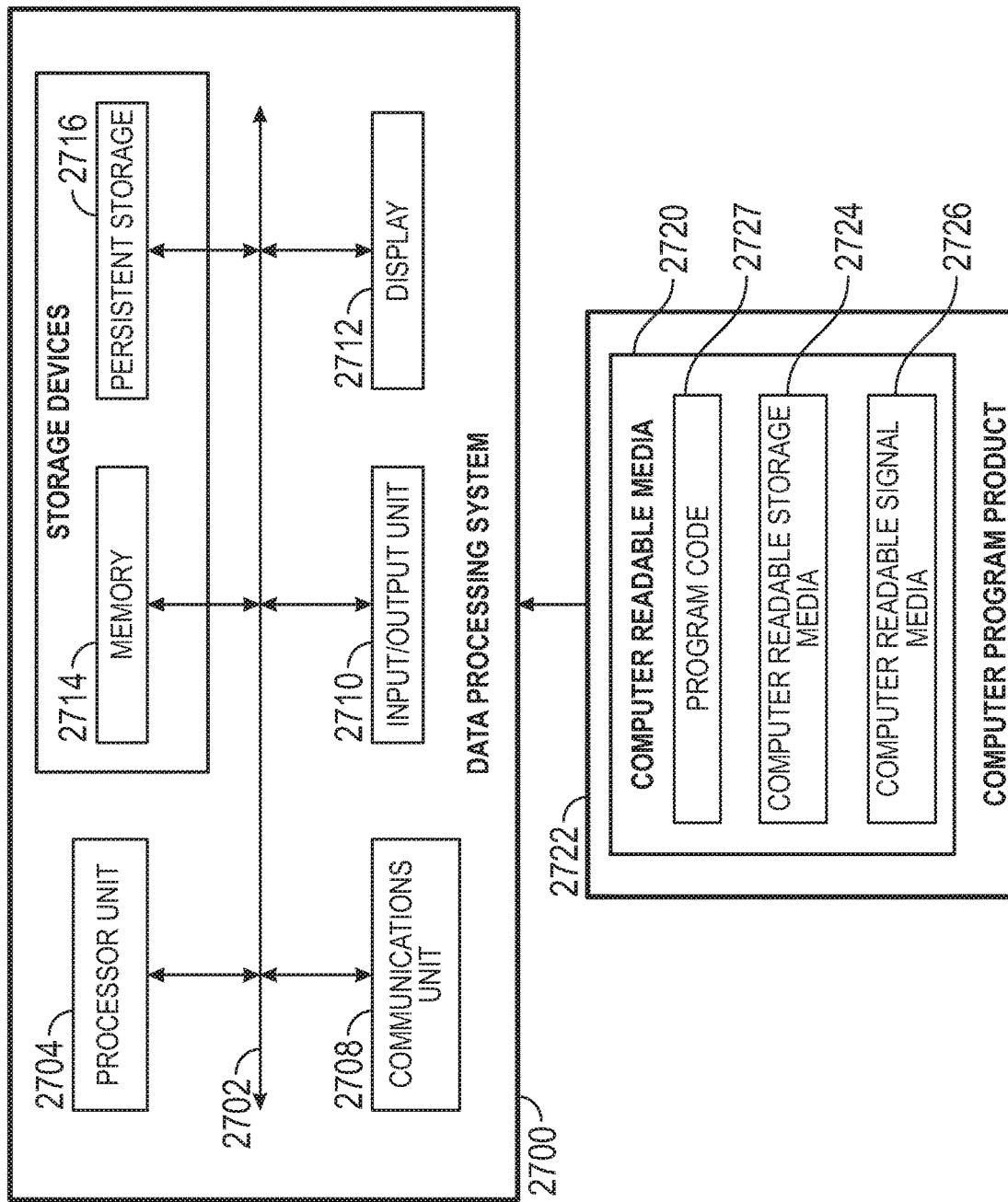
FIG. 27 is a block diagram of a data processing system in accordance with an example embodiment.

Turning now to FIG. 27, an illustration of a data processing system in the form of a block diagram is depicted in accordance with an example embodiment. Data processing system 2700 may be used to implement one or more components of handler system 100 described in FIGS. 1-21 or a control system in communication with one or more components of handler system 100 in FIG. 1-21. For example, data processing system 2700 may be used to implement a control system that controls operation of handler system 100 in FIGS. 1-21. In cases, data processing system 2700 is integrated as part of a mobile device (e.g., a tablet, a laptop, a smartphone, or some other type of mobile device).

As depicted, data processing system 2700 includes communications framework 2702, which provides communications between processor unit 2704, storage devices 2706, communications unit 2708, input/output unit 2710, and display 2712. In some cases, communications framework 2702 may be implemented as a bus system.

Processor unit 2704 is configured to execute instructions for software to perform a number of operations. Processor unit 2704 may comprise a number of processors, a multi-processor core, and/or some other type of processor, depending on the implementation. In some cases, processor unit 2704 may take the form of a hardware unit, such as a circuit system, an application specific integrated circuit (ASIC), a programmable logic device, or some other suitable type of hardware unit.

Instructions for the operating system, applications, and/or programs run by processor unit 2704 may be located in storage devices 2706. Storage devices 2706 may be in communication with processor unit 2704 through communications framework 2702. As used herein, a storage device, also referred to as a computer readable storage device, is any piece of hardware capable of storing information on a temporary and/or permanent basis. This information may include, but is not limited to, data, program code, and/or other information.

Memory 2714 and persistent storage 2716 are examples of storage devices 2706. Memory 2714 may take the form of, for example, a random-access memory or some type of volatile or non-volatile storage device. Persistent storage 2716 may comprise any number of components or devices. For example, persistent storage 2716 may comprise a hard drive, a flash memory, a rewritable optical disk, a rewritable magnetic tape, or some combination of the above. The media used by persistent storage 2716 may or may not be removable.

Communications unit 2708 allows data processing system 2700 to communicate with other data processing systems and/or devices. Communications unit 2708 may provide communications using physical and/or wireless communications links.

Input/output unit 2710 allows input to be received from and output to be sent to other devices connected to data processing system 2700. For example, input/output unit 2710 may allow user input to be received through a keyboard, a mouse, and/or some other type of input device. As another example, input/output unit 2710 may allow output to be sent to a printer connected to data processing system 2700.

Display 2712 is configured to display information to a user. Display 2712 may comprise, for example, without limitation, a monitor, a touch screen, a laser display, a holographic display, a virtual display device, and/or some other type of display device.

In this illustrative example, the processes of the different example embodiments may be performed by processor unit 2704 using computer-implemented instructions. These instructions may be referred to as program code, computer usable program code, or computer readable program code and may be read and executed by one or more processors in processor unit 2704.

In these examples, program code 2718 is located in a functional form on computer readable media 2720, which is selectively removable, and may be loaded onto or transferred to data processing system 2700 for execution by processor unit 2704. Program code 2718 and computer readable media 2720 together form computer program product 2722. In this illustrative example, computer readable media 2720 may be computer readable storage media 2724 or computer readable signal media 2726.

Computer readable storage media 2724 is a physical or tangible storage device used to store program code 2718 rather than a medium that propagates or transmits program code 2718. Computer readable storage media 2724 may be, for example, without limitation, an optical or magnetic disk or a persistent storage device that is connected to data processing system 2700.

Alternatively, program code 2718 may be transferred to data processing system 2700 using computer readable signal media 2726. Computer readable signal media 2726 may be, for example, a propagated data signal containing program code 2718. This data signal may be an electromagnetic signal, an optical signal, and/or some other type of signal that can be transmitted over physical and/or wireless communications links.

The illustration of data processing system 2700 in FIG. 27 is not meant to provide architectural limitations to the manner in which the example embodiments may be implemented. The different example embodiments may be implemented in a data processing system that includes components in addition to or in place of those illustrated for data processing system 2700. Further, components shown in FIG. 27 may be varied from the illustrative examples shown.

Figure 28:
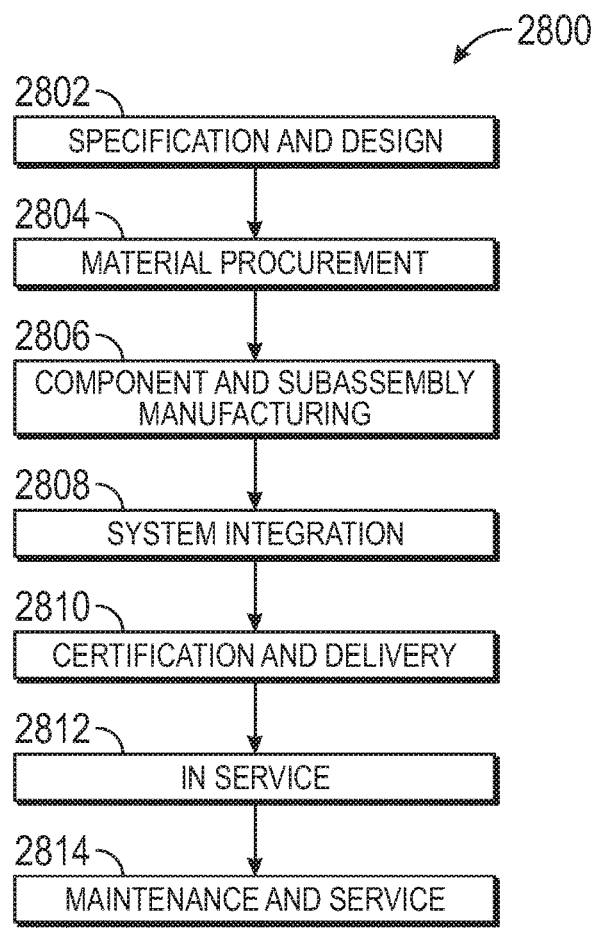
FIG. 28 is an illustration of an aircraft manufacturing and service method in accordance with an example embodiment in accordance with an example embodiment.
Figure 29:
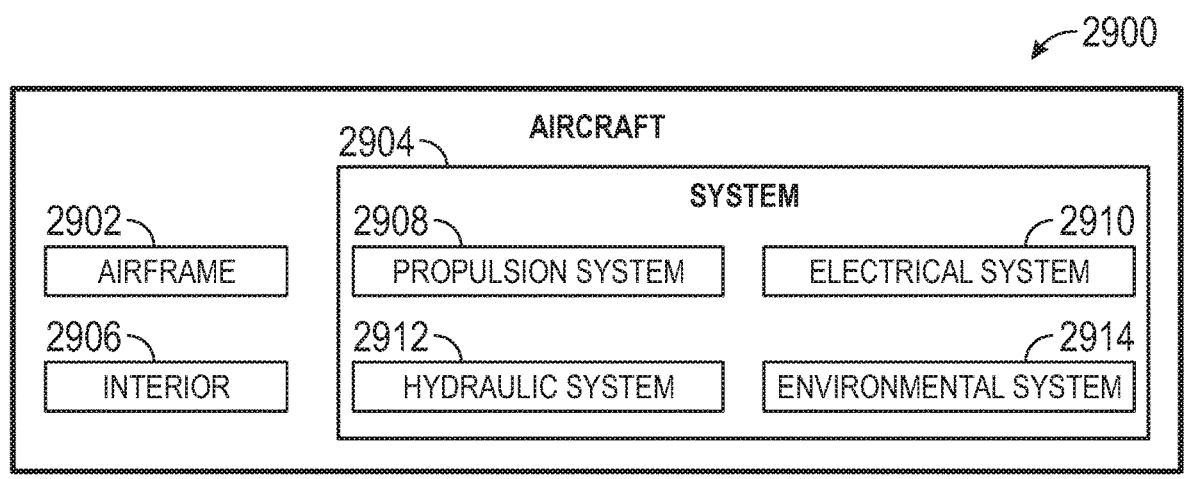
FIG. 29 is a block diagram of an aircraft in accordance with an example embodiment.

Example embodiments of the disclosure may be described in the context of aircraft manufacturing and service method 2800 as shown in FIG. 28 and aircraft 2900 as shown in FIG. 29. Turning first to FIG. 28, an illustration of an aircraft manufacturing and service method is depicted in accordance with an example embodiment. During pre-production, aircraft manufacturing and service method 2800 may include specification and design 2802 of aircraft 2900 in FIG. 29 and material procurement 2804.

During production, component and subassembly manufacturing 2806 and system integration 2808 of aircraft 2900 in FIG. 29 takes place. Thereafter, aircraft 2900 in FIG. 29 may go through certification and delivery 2810 in order to be placed in service 2812. While in service 2812 by a customer, aircraft 2900 in FIG. 29 is scheduled for routine maintenance and service 2814, which may include modification, reconfiguration, refurbishment, and other maintenance or service.

Each of the processes of aircraft manufacturing and service method 2800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 29, an illustration of an aircraft is depicted in which an example embodiment may be implemented. In this example, aircraft 2900 is produced by aircraft manufacturing and service method 2800 in FIG. 28 and may include airframe 2902 with plurality of systems 2904 and interior 2906. Examples of systems 2904 include one or more of propulsion system 2908, electrical system 2910, hydraulic system 2912, and environmental system 2914. Any number of other systems may be included. Although an aerospace example is shown, different example embodiments may be applied to other industries, such as the automotive industry.

Apparatuses and methods embodied herein may be employed during at least one of the stages of aircraft manufacturing and service method 2800 in FIG. 28. In particular, handler system 100 from FIG. 1 may be used during any one of the stages of aircraft manufacturing and service method 2800. For example, without limitation, handler system 100 from FIG. 1 may be used to automate the handling of a structure or engagement of a fitting coupled to the structure during at least one of component and subassembly manufacturing 2806, system integration 2808, routine maintenance and service 2814, or some other stage of aircraft manufacturing and service method 2800. Further, handler system 100 from FIG. 1 may be used in the assembly of at least one of airframe 2902 or interior 2906 of aircraft 2900.

In one illustrative example, components or subassemblies produced in component and subassembly manufacturing 2806 in FIG. 28 may be fabricated or manufactured in a manner similar to components or subassemblies produced while aircraft 2900 is in service 2812 in FIG. 28. As yet another example, one or more apparatus embodiments, method embodiments, or a combination thereof may be utilized during production stages, such as component and subassembly manufacturing 2806 and system integration 2808 in FIG. 28. One or more apparatus embodiments, method embodiments, or a combination thereof may be utilized while aircraft 2900 is in service 2812 and/or during maintenance and service 2814 in FIG. 28. The use of a number of the different example embodiments may substantially expedite the assembly of and/or reduce the cost of aircraft 2900.

Thus, the example embodiments described above provide methods and apparatus for automating the handling or manipulation of a structure, such as a fuselage side panel. The panel may be transported by a handler system from a support (e.g., a build fixture) to an assembly, such as a fuselage assembly. The handler system holds the panel in place adjacent to the assembly and adjusts the panel in a least one of translation or rotation to match up to determinate assembly holes in the assembly. These operations may be performed autonomously (fully autonomously or semi-autonomously). The handler system uses load alleviation via the various end effectors of the handler system to ensure that no one point on the panel is overloaded. The methods and various configurations of handler system described above may be used to improve the overall quality of an assembly built using a determinate assembly method and to improve (e.g., speed up) production rates.

In one example embodiment, a method for automated engagement and handling of a structure is provided. A handler system is moved into a position relative to a support that is holding the structure, the handler system including a plurality of end effectors. The plurality of end effectors is positioned relative to a plurality of fittings coupled to the structure. The plurality of fittings is engaged with the plurality of end effectors to secure the structure to the handler system, wherein each of the plurality of fittings is engaged by a corresponding end effector of the plurality of end effectors. The handler system with the structure secured to the handler system is moved away from the support.

In another example embodiment, a method is provided for automated handling of a structure. A handler system with the structure secured to the handler system is moved for positioning alongside an assembly, the handler system being having a plurality of end effectors engaged with a corresponding plurality of fittings coupled to the structure. The handler system positions the structure in a selected position relative to the assembly using a laser guidance system. The structure is joined to the assembly. The plurality of end effectors is disengaged from the corresponding plurality of fittings after the structure has been joined with the assembly. The handler system is moved away from the assembly.

In yet another example embodiment, a handler system comprises a plurality of towers and a plurality of end effectors coupled to the plurality of towers. Each of the plurality of end effectors is movably coupled to a tower of the plurality of towers. Each of the plurality of end effectors comprises an arm coupled to the tower and a coupling device for use in automated engagement of a corresponding fitting coupled to the structure.

In one example embodiment, an apparatus for automated engagement of a fitting coupled to a structure comprises a base, a first engagement device, and a second engagement device. The base has a first end and a second end. The first engagement device is movably coupled to the base and positioned relative to the first end of the base. The first engagement device includes a first member having a tapered end portion. The second engagement device is coupled to the second end of the base. The second engagement device includes a second member having a channel for receiving the tapered end portion of the first member after the tapered end portion of the first member has passed through a hole in the fitting to thereby engage the fitting.

In another example embodiment, a method is provided for automated engagement of a fitting coupled to a structure. A first member of a first engagement device is moved relative to a base in a first direction substantially parallel to an x-axis such that a tapered end portion of the first member passes through a hole in the fitting and moves towards a channel within a second member of a second engagement device. The tapered end portion of the first member is secured within the channel of the second member to thereby engage the fitting between the first engagement device and the second engagement device.

In yet another example embodiment, a method is provided for automated engagement of a fitting coupled to a fuselage panel. A coupling device of an end effector is positioned relative to the fitting to thereby position a first engagement device of the coupling device and a second engagement device of the coupling device on opposite sides of a hole in the fitting. A first member of the first engagement device is moved relative to a base of the coupling device in a first direction substantially parallel to an x-axis such that a tapered end portion of the first member passes through the hole in the fitting and moves towards a channel within a second member of the second engagement device. The tapered end portion of the first member is secured within the channel of the second member to thereby engage the fitting between the first engagement device and the second engagement device.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for automated engagement and handling of a structure, the method comprising:
   moving a handler system into a position relative to a support that is holding the structure, the handler system including a plurality of end effectors;
   positioning the plurality of end effectors relative to a plurality of fittings coupled to the structure such that a coupling device of each end effector of the plurality of end effectors is positioned relative to a corresponding fitting of the plurality of fittings;
   wherein a first engagement device of the coupling device of each end effector and a second engagement device of the coupling device are positioned on opposite sides of a hole in the corresponding fitting; and
   engaging the plurality of fittings with the plurality of end effectors to secure the structure to the handler system
   moving the handler system with the structure secured to the handler system away from the support.

2. The method of claim 1, further comprising:
   moving the handler system with the structure secured to the handler system for positioning alongside an assembly; and
   positioning, by the handler system, the structure in a selected position relative to the assembly.

3. The method of claim 2, further comprising:
   joining the structure to the assembly;
   disengaging the plurality of end effectors from the plurality of fittings after the structure has been joined with the assembly; and
   moving the handler system away from the assembly.

4. The method of claim 1, wherein positioning the plurality of end effectors comprises:
   positioning a first end effector coupled to a first tower of the handler system relative to a first fitting of the plurality of fittings; and
   positioning a second end effector coupled to the first tower of the handler system relative to a second fitting of the plurality of fittings.

5. The method of claim 4, wherein positioning the first end effector comprises:
   positioning the coupling device of the first end effector relative to the first fitting with respect to at least one of an x-axis, a y-axis, or a z-axis to thereby position the first engagement device of the coupling device and the second engagement device of the coupling device on opposite sides of a first hole in the first fitting.

6. The method of claim 5, wherein positioning the second end effector comprises:
   positioning the coupling device of the second end effector relative to the second fitting with respect to at least one of the x-axis, the y-axis, or the z-axis to thereby position the first engagement device of the coupling device and the second engagement device of the coupling device on opposite sides of a second hole in the second fitting, wherein the coupling device of the first end effector is positioned independently of the coupling device of the second end effector.

7. The method of claim 1, wherein positioning the plurality of end effectors comprises:
   positioning a first pair of end effectors coupled to a first tower of the handler system relative to a first pair of fittings from the plurality of fittings;
   positioning a second pair of end effectors coupled to a second tower of the handler system relative to a second pair of fittings from the plurality of fittings; and
   positioning a third pair of end effectors coupled to a third tower of the handler system relative to a third pair of fittings from the plurality of fittings.

8. The method of claim 1, wherein engaging the plurality of fittings with the plurality of end effectors comprises:
   moving a first member of the coupling device of an end effector of the plurality of end effectors relative to a base of the end effector in a direction substantially parallel to an x-axis such that a tapered end portion of the first member passes through a hole in the corresponding fitting and moves towards a channel within a second member of the coupling device; and securing the tapered end portion of the first member within the channel of the second member to thereby engage the corresponding fitting with the first member and the second member.

9. A method for automated handling of a structure, the method comprising:
   moving a handler system with the structure secured to the handler system for positioning alongside an assembly, the handler system having a plurality of end effectors engaged with a corresponding plurality of fittings coupled to the structure;
   positioning, by the handler system, the structure in a selected position relative to the assembly using a laser guidance system;
   joining the structure to the assembly;
   disengaging the plurality of end effectors from the corresponding plurality of fittings after the structure has been joined with the assembly; and
   moving the handler system away from the assembly.

10. The method of claim 9, further comprising:
    moving the handler system into a position relative to a support that is holding the structure;
    positioning the plurality of end effectors relative to the corresponding plurality of fittings coupled to the structure; and
    operating the plurality of end effectors to engage the corresponding plurality of fittings to thereby secure the structure to the handler system, wherein each fitting of the corresponding plurality of fittings is engaged by a corresponding end effector of the plurality of end effectors.

11. The method of claim 9, wherein moving the handler system comprises:
    moving a platform structure to which a plurality of towers are coupled, the plurality of end effectors being coupled to the plurality of towers,
       wherein the plurality of end effectors includes a pair of end effectors coupled to each tower of the plurality of towers; and
       wherein each end effector of the pair of end effectors is independently capable of being positioned to engage a fitting of the corresponding plurality of fittings coupled to the structure.

12. A handler system for handling a structure, the handler system comprising:
    a plurality of towers; and
    a plurality of end effectors coupled to the plurality of towers, wherein each of the plurality of end effectors is movably coupled to a corresponding tower of the plurality of towers and comprises:
       an arm coupled to the tower; and
       a coupling device for use in automated engagement of a corresponding fitting coupled to the structure, wherein the coupling device comprises:
          a base;
          a first engagement device movably coupled to the base; and
          a second engagement device fixedly coupled to the base.

13. The handler system of claim 12, further comprising:
    a platform structure, wherein each of the plurality of towers is movably coupled to the platform structure; and
    a mobile system coupled to the platform structure to move the platform structure on a floor.

14. The handler system of claim 12, further comprising:
    a control system at least partially housed in a control unit coupled to the corresponding tower to which to a pair of end effectors is coupled, wherein the control system controls a positioning of the pair of end effectors and of the coupling device of each end effector of the pair of end effectors relative to the corresponding fitting coupled to the structure.

15. The handler system of claim 12, wherein each end effector of the plurality of end effectors comprises:
    a support system configured to move the base relative to the first engagement device with at least one of at least one degree of translational freedom or at least one degree of rotational freedom.

16. The handler system of claim 12, wherein the first engagement device includes a first member having a tapered end portion and the second engagement device includes a second member having a channel configured to receive the tapered end portion of the first member.

17. The handler system of claim 16, wherein the tapered end portion is conically tapered to allow the tapered end portion to pass through a range of diameters of a hole in the corresponding fitting.

18. The handler system of claim 12, wherein the plurality of towers comprises:
    a first tower having a first pair of end effectors of the plurality of end effectors coupled to the first tower;
    a second tower having a second pair of end effectors of the plurality of end effectors coupled to the second tower; and
    a third tower having a third pair of end effectors of the plurality of end effectors coupled to the third tower,
    wherein each end effector of the first pair of end effectors, the second pair of end effectors, and the third pair of end effectors is used to engage with a different fitting coupled to the structure.

19. The handler system of claim 12, wherein each end effector of the plurality of end effectors comprises:
    a load sensor system for measuring a load along at least one of an x-axis, a y-axis, or a z-axis.

20. The handler system of claim 12 further comprising:
    a pair of cradles movably coupled to a tower of the plurality of towers, wherein a corresponding end effector of the plurality of end effectors is coupled to each cradle of the pair of cradles,
    wherein each cradle is movable relative to the tower in a direction substantially parallel to a z-axis; and
    wherein the corresponding end effector is movable relative to the cradle, and thereby the tower, in a direction substantially parallel to a y-axis.

* * * * *